US012262281B2

(12) United States Patent
Nurminen et al.

(10) Patent No.: US 12,262,281 B2
(45) Date of Patent: Mar. 25, 2025

(54) CONTROLLED ACCESS OF RADIO MAP QUALITY INFORMATION

(71) Applicant: HERE Global B.V., Eindhoven (NL)

(72) Inventors: Henri Jaakko Julius Nurminen, Tampere (FI); Pavel Ivanov, Tampere (FI); Marko Luomi, Lempäälä (FI); Lauri Aarne Johannes Wirola, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 667 days.

(21) Appl. No.: 17/407,671

(22) Filed: Aug. 20, 2021

(65) Prior Publication Data
US 2023/0053402 A1 Feb. 23, 2023

(51) Int. Cl.
*H04W 4/029* (2018.01)
*H04W 4/021* (2018.01)

(52) U.S. Cl.
CPC ........... *H04W 4/029* (2018.02); *H04W 4/021* (2013.01)

(58) Field of Classification Search
CPC ..... H04W 4/029; H04W 4/021; H04W 72/23; H04W 72/21; H04W 24/10; H04W 88/08; H04W 88/02; H04W 72/542; H04W 64/00; H04W 92/18; H04W 28/0268; H04W 88/04; H04W 4/02; H04W 72/54; H04W 36/30; H04W 36/302; H04W 8/08; H04W 52/241; H04W 28/0236; H04W 52/0209; H04W 4/38; H04W 4/025; H04W 36/322; H04W 40/20; H04W 12/63; H04W 4/33;
(Continued)

(56) References Cited

U.S. PATENT DOCUMENTS 8,938,255 B2   1/2015 Tsruya et al.
10,139,471 B2  11/2018 Ivanov et al.
(Continued)

FOREIGN PATENT DOCUMENTS

EP  2833676 A1 * 2/2015 ............ H04W 48/16
EP  3754358       12/2020

OTHER PUBLICATIONS

Laoudias et al., "Indoor Quality-of-Position Visual Assessment Using Crowdsourced Fingerprint Maps", ACM Transactions on Spatial Algorithms and Systems, vol. 7, Issue 2, (Feb. 2021), 32 pages.

*Primary Examiner* — Alison Slater
*Assistant Examiner* — Jing Gao
(74) *Attorney, Agent, or Firm* — Jason Wejnert; HERE GLOBAL B.V.

(57) ABSTRACT

A network device stores a radio map comprising map data configured to enable radio-based positioning within a geographic area. The radio map is associated with a plurality of instances of quality information, with each instance of quality information corresponding to a respective location within the geographic area. The network device receives a quality information request corresponding to a geographic region within the geographic area. The quality information request is associated with an entity. Based on a determination of whether a contribution by the entity to a portion of the map data that corresponds to the geographic region satisfies one or more significance criteria, the network device either provides or withholds quality information corresponding to the geographic region.

16 Claims, 6 Drawing Sheets

(58) Field of Classification Search
CPC ..... H04W 16/20; H04W 84/00; H04W 16/00; H04W 12/64; H04W 12/79; G01S 5/02524; G01S 5/02523; G01S 5/0236; G01S 5/0036; G01S 5/02; G01S 5/06; G01S 5/0284; G01S 5/0244; G01S 19/42; G01S 5/0009; G01S 5/0027; G01S 19/05; G01S 19/13; G01S 17/89; G01S 5/02521; G01S 5/0289; G01S 5/0018; G01S 19/14; G01S 5/0252; G01S 1/026; G01S 5/0226; G01S 5/0268; G01S 5/0278; G01S 5/0045; G01S 1/0428; G01S 19/396; G01S 1/042; G01S 19/06; G01S 5/0054; G01S 5/0242; G01S 11/06; G01S 5/04; G01S 5/0063; G01S 5/011; G01S 5/02526; G01S 19/03; G01S 5/02213; G01S 5/0295; G01S 13/89; G01S 13/876; G01S 15/89; G01S 5/02525; G01S 5/01; G01S 19/51; G01S 7/497; G01S 5/0257; G01S 11/02; G01S 19/08; G01S 2205/02

See application file for complete search history.

(56) References Cited

U.S. PATENT DOCUMENTS

| | | |
|---|---|---|
| 10,794,986 B2 | 10/2020 | Bhatti et al. |
| 2017/0371023 A1* | 12/2017 | Syrjärinne .......... G01S 5/02521 |
| 2017/0371024 A1* | 12/2017 | Ivanov .................... H04W 4/02 |

* cited by examiner

CONTROLLED ACCESS OF RADIO MAP QUALITY INFORMATION

TECHNOLOGICAL FIELD

An example embodiment relates to controlling access to quality information corresponding to radio-based positioning. An example embodiment relates to controlling access to quality information corresponding to a shared radio map configured to enable radio-based positioning.

BACKGROUND

In various scenarios, global navigation satellite system (GNSS)-based positioning is not available and/or not accurate (e.g., indoors, in urban canyons, and/or the like). In such scenarios, radio-based positioning may be used. In various scenarios, radio-based positioning may also be used to decrease the battery expenditure of a computing device to determine a position estimate for the computing device. For example, a computing device may observe one or more network access points (e.g., cellular network access points, Wi-Fi network access points, Bluetooth network access points, and/or other radio frequency-based network access points) and, based on characteristics of the observations and a radio map indicating the known location of the observed access points, a position estimate for the computing device may be determined.

In various scenarios, the radio map is generated by crowd-sourcing information about the network access points observable in various locations. Therefore, it may be desirable to indicate to users providing the crowd-sourced information locations were the radio map is of sufficient quality and additional information is not needed and locations were the radio map is of low quality and additional information is desired. However, in a variety of circumstances, it may be desired to withhold information regarding the quality of a radio map, positioning enabled by the radio map, and/or the like from bad faith users.

BRIEF SUMMARY

Various embodiments provide methods, apparatus, systems, and computer program products for controlling access to quality information corresponding to a radio map and/or positioning enabled by the radio map. In various embodiments, a user device associated with an entity provides instances of radio data that are used to generate and/or update the radio map. In various embodiments, responsive to receiving and/or processing a quality information request generated and/or provided by the user device, it may be determined whether a contribution made by the entity associated with the user device to a portion of map data of the radio map corresponding to a geographic region satisfies one or more significance criteria and/or contribution measures. Based on the determination of whether the contribution made by the entity to the portion of map data of the radio map corresponding to the geographic region satisfies the one or more significance criteria and/or contribution measures, quality information is either provided or withheld. For example, in various embodiments, when it is determined that the contribution provided by the entity to the portion of the map data corresponding to the geographic region satisfies the one or more significance criteria and/or contribution measures, one or more instances of quality information corresponding to respective locations located within the geographic region are provided (e.g., transmitted) for receipt by the user device. For example, in various embodiments, when it is determined that the contribution provided by the entity to the map data corresponding to the geographic region does not satisfy the one or more significance criteria and/or contribution measures, the instances of quality information corresponding to respective locations located within the geographic region are withheld from the user device. For example, access to the quality information corresponding to the geographic region may be prevented and/or denied when it is determined that the contribution provided by the entity to the map data corresponding to the geographic region does not satisfy the one or more significance criteria and/or contribution measures.

Various embodiments provide methods, apparatus, systems, and computer program products for displaying a graphical representation of quality information. For example, a user device may generate and/or capture instances of radio data and provide (e.g., transmit) the instances of radio data such that the network device receives the instances of radio data and uses the instances of radio data to generate and/or update the radio map. In various embodiments, the user device generates and provides a quality information request. In an example embodiment, the quality information request indicates one or more particular geographic regions for which quality information is being requested. In various embodiments, in response to the quality information request, a network device provides a message. When it is determined (e.g., by the network device and/or by the user device) that the contribution to a portion of the map data of the radio map that corresponds to a particular geographic region satisfies one or more significance criteria and/or contribution measures, the message includes one or more instances of quality information corresponding to locations disposed and/or located within the particular geographic region. Otherwise, the message may include an indication that quality information corresponding to the particular geographic region is being withheld and/or that access to the quality information corresponding to the particular geographic region is being prevented and/or denied. In various embodiments, when the user device receives one or more instances of quality information, the user device processes the one or more instances of quality information to generate a geographical representation thereof. In an example embodiment, the user device then displays the geographical representation of the one or more instances of quality information corresponding to the particular geographic region overlaid on a graphical representation of the particular geographic region via a user interface of the user device.

In an example embodiment, a network device stores a radio map comprising map data configured to enable radio-based positioning within a geographic area. The radio map is associated with a plurality of instances of quality information, and each instance of quality information of the plurality of instances of quality information corresponds to a respective location within the geographic area. The network device receives a quality information request corresponding to a geographic region within the geographic area. The quality information request is associated with an entity. Based on a determination of whether a contribution by the entity to a portion of the map data that corresponds to the geographic region satisfies one or more significance criteria and/or contribution measures, the network device provides or withholds quality information corresponding to the geographic region.

In an example embodiment a user device provides a quality information request. Responsive to providing the quality information request, the user device receives one or more instances of quality information. Each instance of quality information is associated with a respective location located within a geographic region of a plurality of geographic regions. An entity associated with the user device has provided a contribution to a portion of map data for the radio map corresponding to the geographic region that satisfies one or more significance thresholds. The user device processes the one or more instances of quality information to generate a graphical representation of at least a portion of the one or more instances of quality information. The user device displays the graphical representation of the one or more instances of quality information overlaid on a graphical representation of the geographic region via a user interface of the user device.

According to an aspect of the present disclosure, a method for controlling access to quality information corresponding to a geographical area is provided. In an example embodiment, the method comprises storing, by a network device, a radio map comprising map data configured to enable radio-based positioning within a geographic area. The radio map is associated with a plurality of instances of quality information, and each instance of quality information of the plurality of instances of quality information corresponds to a respective location within the geographic area. The method further comprises receiving, by the network device, a quality information request corresponding to a geographic region within the geographic area. The quality information request is associated with an entity. The method further comprises, based on a determination of whether a contribution by the entity to a portion of the map data that corresponds to the geographic region satisfies one or more significance criteria and/or contribution measures, providing or withholding quality information corresponding to the geographic region.

In an example embodiment, when it is determined that the contribution provided by the entity to the portion of the map data corresponding to the geographic region satisfies the one or more significance criteria and/or contribution measures, transmitting one or more instances of quality information corresponding to respective locations located within the geographic region for receipt by the user device; and when it is determined that the contribution provided by the entity to the map data corresponding to the geographic region does not satisfy the one or more significance criteria and/or contribution measures, withholding the instances of quality information corresponding to respective locations located within the geographic region from the user device. In an example embodiment, the one or more instances of quality information are configured such that processing of the one or more instances of quality information by the user device causes the user device to provide a graphical representation of the at least one of (a) a quality of infrastructure, (b) a quality of learning, or (c) a quality of positioning enabled at the respective location within the geographic region. In an example embodiment, the one or more instances of quality information collectively constitute quality information for the geographic region. In an example embodiment, the method further comprises determining that the contribution provided by the entity to the portion of the map data corresponding to each of a first number of geographic regions with the geographic area satisfies the one or more significance criteria and/or contribution measures; determining that the first number of geographic regions is greater than a threshold quantity of geographic regions; and determining a set of regions selected from the geographic regions for which the contributions provided by the entity to the portion of the map data satisfies the one or more significance criteria and/or contribution measures, the set of regions containing a second number of geographic regions, the second number of geographic regions being at most a threshold quantity of geographic regions, wherein providing the one or more instances of quality information comprises providing instances of quality information only corresponding to respective locations located within geographic regions included in the set of regions.

In an example embodiment, an entity is associated with one of (a) a single device, (b) a user account associated with one or more devices, or (c) a project associated with one or more user accounts. In an example embodiment, the contribution provided by the entity to the portion of the map data corresponding to the geographic region is measured by a number of instances of radio data comprising position estimates corresponding to positions located within the geographic region provided by the entity for use in generating the radio map. In an example embodiment, the one or more significance criteria and/or contribution measures comprises a threshold number of instances of radio data comprising position estimates corresponding to positions located within the geographic region. In an example embodiment, the number of instances of radio data is adjusted to only account for instances of radio data provided by the entity that are determined to have a low probability of having been manipulated.

In an example embodiment, determining whether the contribution provided by the entity to the map data corresponding to the geographic region satisfies the one or more significance criteria and/or contribution measures comprises determining whether a status associated with the entity satisfies a status threshold, wherein when the status associated with the entity satisfies the status threshold, at least one of the one or more significance criteria and/or contribution measures is satisfied and when the status associated with the entity does not satisfy the status threshold, the one or more significance criteria and/or contribution measures are not satisfied. In an example embodiment, the contribution provided by the entity to the map data corresponding to the geographic region comprises one or more instances of radio data comprising position estimates corresponding to positions located within the geographic region provided by the entity for use by the network device in generating the radio map, each instance of radio data of the one or more instances of radio data associated with a ranking indicating a respective trustworthiness of the instance of radio data and the status associated with the entity is determined based at least in part on the ranking associated with at least one of the one or more instances of radio data provided by the entity.

In an example embodiment, when it is determined that the contribution provided by the entity to the map data corresponding to the geographic region satisfies the one or more significance criteria and/or contribution measures, the user device is enabled to access the one or more instances of quality information corresponding to respective locations located within the geographic region until one or more access expiration criteria are met. In an example embodiment, each time the user device submits a map data contribution corresponding to a particular geographic region, a counter corresponding to the particular geographic region is incremented to indicate a volume of the contribution provided by the entity associated with the device to the map data corresponding to the geographic region. In an example embodiment, the volume corresponds to a sliding time window. In an example embodiment, the user device stores the counter and provides a value of the counter or an indication that the counter satisfies a threshold as part of the quality information request. In an example embodiment, the method further comprises providing a position log inquiry requesting the user device confirm that the user device was located at a respective position associated with one or more instances of radio information during a respective time period corresponding to the capture of the one or more instances of radio information and receiving a confirmation generated by the user device in response to the position log inquiry.

According to another aspect of the present disclosure, an apparatus is provided. In an example embodiment, the apparatus comprises at least one processor and at least one memory storing computer program instructions. The at least one memory and the computer program instructions are configured to, with the at least one processor, cause the apparatus to at least store a radio map comprising map data configured to enable radio-based positioning within a geographic area, wherein the radio map is associated with a plurality of instances of quality information, and each instance of quality information of the plurality of instances of quality information corresponds to a respective location within the geographic area; receive a quality information request corresponding to a geographic region within the geographic area, the quality information request is associated with an entity; and based on a determination of whether a contribution by the entity to a portion of the map data that corresponds to the geographic region satisfies one or more significance criteria and/or contribution measures, provides or withholds quality information corresponding to the geographic region.

In an example embodiment, when it is determined that the contribution provided by the entity to the portion of the map data corresponding to the geographic region satisfies the one or more significance criteria and/or contribution measures, transmitting one or more instances of quality information corresponding to respective locations located within the geographic region for receipt by the user device; and when it is determined that the contribution provided by the entity to the map data corresponding to the geographic region does not satisfy the one or more significance criteria and/or contribution measures, withholding the instances of quality information corresponding to respective locations located within the geographic region from the user device. In an example embodiment, the one or more instances of quality information are configured such that processing of the one or more instances of quality information by the user device causes the user device to provide a graphical representation of the at least one of (a) a quality of infrastructure, (b) a quality of learning, or (c) a quality of positioning enabled at the respective location within the geographic region. In an example embodiment, the one or more instances of quality information collectively constitute quality information for the geographic region. In an example embodiment, the at least one memory and the computer program instructions are further configured to, with the processor, cause the apparatus to at least determining that the contribution provided by the entity to the portion of the map data corresponding to each of a first number of geographic regions with the geographic area satisfies the one or more significance criteria and/or contribution measures; determining that the first number of geographic regions is greater than a threshold quantity of geographic regions; and determining a set of regions selected from the geographic regions for which the contributions provided by the entity to the portion of the map data satisfies the one or more significance criteria and/or contribution measures, the set of regions contains a second number of geographic regions, the second number of geographic regions being at most a threshold quantity of geographic regions, wherein providing the one or more instances of quality information comprises providing instances of quality information only corresponding to respective locations located within geographic regions included in the set of regions.

In an example embodiment, an entity is associated with one of (a) a single device, (b) a user account associated with one or more devices, or (c) a project associated with one or more user accounts. In an example embodiment, the contribution provided by the entity to the portion of the map data corresponding to the geographic region is measured by a number of instances of radio data comprising position estimates corresponding to positions located within the geographic region provided by the entity for use in generating the radio map. In an example embodiment, the one or more significance criteria and/or contribution measures comprises a threshold number of instances of radio data comprising position estimates corresponding to positions located within the geographic region. In an example embodiment, the number of instances of radio data is adjusted to only account for instances of radio data provided by the entity that are determined to have a low probability of having been manipulated.

In an example embodiment, determining whether the contribution provided by the entity to the map data corresponding to the geographic region satisfies the one or more significance criteria and/or contribution measures comprises determining whether a status associated with the entity satisfies a status threshold, wherein when the status associated with the entity satisfies the status threshold, at least one of the one or more significance criteria and/or contribution measures is satisfied and when the status associated with the entity does not satisfy the status threshold, the one or more significance criteria and/or contribution measures are not satisfied. In an example embodiment, the contribution provided by the entity to the map data corresponding to the geographic region comprises one or more instances of radio data comprising position estimates corresponding to positions located within the geographic region provided by the entity for use by the network device in generating the radio map, each instance of radio data of the one or more instances of radio data associated with a ranking indicating a respective trustworthiness of the instance of radio data and the status associated with the entity is determined based at least in part on the ranking associated with at least one of the one or more instances of radio data provided by the entity.

In an example embodiment, when it is determined that the contribution provided by the entity to the map data corresponding to the geographic region satisfies the one or more significance criteria and/or contribution measures, the user device is enabled to access the one or more instances of quality information corresponding to respective locations located within the geographic region until one or more access expiration criteria are met. In an example embodiment, each time the user device submits a map data contribution corresponding to a particular geographic region, a counter corresponding to the particular geographic region is incremented to indicate a volume of the contribution provided by the entity associated with the device to the map data corresponding to the geographic region. In an example embodiment, the volume corresponds to a sliding time window. In an example embodiment, the user device stores the counter and provides a value of the counter or an indication that the counter satisfies a threshold as part of the quality information request. In an example embodiment, the at least one memory and the computer program instructions are further configured to, with the processor, cause the apparatus to at least providing a position log inquiry requesting the user device confirm that the user device was located at a respective position associated with one or more instances of radio information during a respective time period corresponding to the capture of the one or more instances of radio information and receiving a confirmation generated by the user device in response to the position log inquiry.

In still another aspect of the present disclosure, a computer program product is provided. In an example embodiment, the computer program product comprises at least one non-transitory computer-readable storage medium having computer-readable program code and/or instructions portions stored therein. The computer-readable program code and/or instructions portions comprise executable portions configured, when executed by a processor of an apparatus, to cause the apparatus to store a radio map comprising map data configured to enable radio-based positioning within a geographic area, wherein the radio map is associated with a plurality of instances of quality information, and each instance of quality information of the plurality of instances of quality information corresponds to a respective location within the geographic area; receive a quality information request corresponding to a geographic region within the geographic area, the quality information request is associated with an entity; and based on a determination of whether a contribution by the entity to a portion of the map data that corresponds to the geographic region satisfies one or more significance criteria and/or contribution measures, provides or withholds quality information corresponding to the geographic region.

In an example embodiment, when it is determined that the contribution provided by the entity to the portion of the map data corresponding to the geographic region satisfies the one or more significance criteria and/or contribution measures, transmitting one or more instances of quality information corresponding to respective locations located within the geographic region for receipt by the user device; and when it is determined that the contribution provided by the entity to the map data corresponding to the geographic region does not satisfy the one or more significance criteria and/or contribution measures, withholding the instances of quality information corresponding to respective locations located within the geographic region from the user device. In an example embodiment, the one or more instances of quality information are configured such that processing of the one or more instances of quality information by the user device causes the user device to provide a graphical representation of the at least one of (a) a quality of infrastructure, (b) a quality of learning, or (c) a quality of positioning enabled at the respective location within the geographic region. In an example embodiment, the one or more instances of quality information collectively constitute quality information for the geographic region. In an example embodiment, the computer-readable program code and/or instructions portions comprise executable portions further configured, when executed by a processor of an apparatus, to cause the apparatus to determining that the contribution provided by the entity to the portion of the map data corresponding to each of a first number of geographic regions with the geographic area satisfies the one or more significance criteria and/or contribution measures; determining that the first number of geographic regions is greater than a threshold quantity of geographic regions; and determining a set of regions selected from the geographic regions for which the contributions provided by the entity to the portion of the map data satisfies the one or more significance criteria and/or contribution measures, the set of regions contains a second number of geographic regions, the second number of geographic regions being at most a threshold quantity of geographic regions, wherein providing the one or more instances of quality information comprises providing instances of quality information only corresponding to respective locations located within geographic regions included in the set of regions.

In an example embodiment, an entity is associated with one of (a) a single device, (b) a user account associated with one or more devices, or (c) a project associated with one or more user accounts. In an example embodiment, the contribution provided by the entity to the portion of the map data corresponding to the geographic region is measured by a number of instances of radio data comprising position estimates corresponding to positions located within the geographic region provided by the entity for use in generating the radio map. In an example embodiment, the one or more significance criteria and/or contribution measures comprises a threshold number of instances of radio data comprising position estimates corresponding to positions located within the geographic region. In an example embodiment, the number of instances of radio data is adjusted to only account for instances of radio data provided by the entity that are determined to have a low probability of having been manipulated.

In an example embodiment, determining whether the contribution provided by the entity to the map data corresponding to the geographic region satisfies the one or more significance criteria and/or contribution measures comprises determining whether a status associated with the entity satisfies a status threshold, wherein when the status associated with the entity satisfies the status threshold, at least one of the one or more significance criteria and/or contribution measures is satisfied and when the status associated with the entity does not satisfy the status threshold, the one or more significance criteria and/or contribution measures are not satisfied. In an example embodiment, the contribution provided by the entity to the map data corresponding to the geographic region comprises one or more instances of radio data comprising position estimates corresponding to positions located within the geographic region provided by the entity for use by the network device in generating the radio map, each instance of radio data of the one or more instances of radio data associated with a ranking indicating a respective trustworthiness of the instance of radio data and the status associated with the entity is determined based at least in part on the ranking associated with at least one of the one or more instances of radio data provided by the entity.

In an example embodiment, when it is determined that the contribution provided by the entity to the map data corresponding to the geographic region satisfies the one or more significance criteria and/or contribution measures, the user device is enabled to access the one or more instances of quality information corresponding to respective locations located within the geographic region until one or more access expiration criteria are met. In an example embodiment, each time the user device submits a map data contribution corresponding to a particular geographic region, a counter corresponding to the particular geographic region is incremented to indicate a volume of the contribution provided by the entity associated with the device to the map data corresponding to the geographic region. In an example embodiment, the volume corresponds to a sliding time window. In an example embodiment, the user device stores the counter and provides a value of the counter or an indication that the counter satisfies a threshold as part of the quality information request. In an example embodiment, the computer-readable program code and/or instructions portions comprise executable portions further configured, when executed by a processor of an apparatus, to cause the apparatus to providing a position log inquiry requesting the user device confirm that the user device was located at a respective position associated with one or more instances of radio information during a respective time period corresponding to the capture of the one or more instances of radio information and receiving a confirmation generated by the user device in response to the position log inquiry.

According to yet another aspect, an apparatus is provided. In an example embodiment, the apparatus comprises means for storing a radio map comprising map data configured to enable radio-based positioning within a geographic area. The radio map is associated with a plurality of instances of quality information, and each instance of quality information of the plurality of instances of quality information corresponds to a respective location within the geographic area. The apparatus comprises means for receiving a quality information request corresponding to a geographic region within the geographic area. The quality information request is associated with an entity. The apparatus comprises means for, based on a determination of whether a contribution by the entity to a portion of the map data that corresponds to the geographic region satisfies one or more significance criteria and/or contribution measures, providing or withholding quality information corresponding to the geographic region.

According to another aspect, a method for displaying quality information for a radio map is provided. In an example embodiment, the method comprises providing, by a user device, a quality information request; and responsive to providing the quality information request, receiving, by the user device, one or more instances of quality information, each instance of quality information associated with a respective location located within a geographic region of a plurality of geographic regions. An entity associated with the user device has provided a contribution to a portion of map data for the radio map corresponding to the geographic region that satisfies one or more significance thresholds. The method further comprises processing, by the user device, the one or more instances of quality information to generate a graphical representation of at least a portion of the one or more instances of quality information; and displaying, by the user device, the graphical representation of the one or more instances of quality information overlaid on a graphical representation of the geographic region via a user interface of the user device.

In an example embodiment, the method further comprises displaying a graphical representation of at least a portion of a second geographic region that indicates a number of additional instances of radio data comprising position estimates indicating positions located within the second geographic region that the entity would need to submit for the user device to be provided with instances of quality information corresponding to the second geographic region. In an example embodiment, the user device is prevented from accessing instances of quality information corresponding to one or more geographic regions of the plurality of geographic regions for which a contribution by an entity associated with the user device to the portion of the map data for the radio map corresponding to respective ones of the one or more geographic regions does not satisfy one or more significance thresholds.

According to another aspect of the present disclosure, an apparatus is provided. In an example embodiment, the apparatus comprises at least one processor and at least one memory storing computer program instructions. The at least one memory and the computer program instructions are configured to, with the at least one processor, cause the apparatus to at least provide a quality information request; and receive one or more instances of quality information in response to the provided quality information request, each instance of quality information associated with a respective location located within a geographic region of a plurality of geographic regions. An entity associated with the user device has provided a contribution to a portion of map data for the radio map corresponding to the geographic region that satisfies one or more significance thresholds. The at least one memory and the computer program instructions are further configured to, with the at least one processor, cause the apparatus to at least process the one or more instances of quality information to generate a graphical representation of at least a portion of the one or more instances of quality information; and display the graphical representation of the one or more instances of quality information overlaid on a graphical representation of the geographic region via a user interface of the apparatus.

In an example embodiment, the at least one memory and the computer program instructions are further configured to, with the at least one processor, cause the apparatus to at least display a graphical representation of at least a portion of a second geographic region that indicates a number of additional instances of radio data comprising position estimates indicating positions located within the second geographic region that the entity would need to submit for the user device to be provided with instances of quality information corresponding to the second geographic region. In an example embodiment, the user device is prevented from accessing instances of quality information corresponding to one or more geographic regions of the plurality of geographic regions for which a contribution by an entity associated with the user device to the portion of the map data for the radio map corresponding to respective ones of the one or more geographic regions does not satisfy one or more significance thresholds.

In still another aspect of the present disclosure, a computer program product is provided. In an example embodiment, the computer program product comprises at least one non-transitory computer-readable storage medium having computer-readable program code and/or instructions portions stored therein. The computer-readable program code and/or instructions portions comprise executable portions configured, when executed by a processor of an apparatus, to cause the apparatus to provide a quality information request; and receive one or more instances of quality information in response to the provided quality information request, each instance of quality information associated with a respective location located within a geographic region of a plurality of geographic regions. An entity associated with the user device has provided a contribution to a portion of map data for the radio map corresponding to the geographic region that satisfies one or more significance thresholds. The computer-readable program code and/or instructions portions comprise executable portions further configured, when executed by a processor of an apparatus, to cause the apparatus to process the one or more instances of quality information to generate a graphical representation of at least a portion of the one or more instances of quality information; and display the graphical representation of the one or more instances of quality information overlaid on a graphical representation of the geographic region via a user interface of the apparatus.

In an example embodiment, the computer-readable program code and/or instructions portions comprise executable portions further configured, when executed by a processor of an apparatus, to cause the apparatus to display a graphical representation of at least a portion of a second geographic region that indicates a number of additional instances of radio data comprising position estimates indicating positions located within the second geographic region that the entity would need to submit for the user device to be provided with instances of quality information corresponding to the second geographic region. In an example embodiment, the user device is prevented from accessing instances of quality information corresponding to one or more geographic regions of the plurality of geographic regions for which a contribution by an entity associated with the user device to the portion of the map data for the radio map corresponding to respective ones of the one or more geographic regions does not satisfy one or more significance thresholds.

According to yet another aspect, an apparatus is provided. In an example embodiment, the apparatus comprises means for providing a quality information request. The apparatus comprises means for receiving one or more instances of quality information in response to the provided quality information request. Each instance of quality information is associated with a respective location located within a geographic region of a plurality of geographic regions. An entity associated with the user device has provided a contribution to a portion of map data for the radio map corresponding to the geographic region that satisfies one or more significance thresholds. The apparatus comprises means for processing the one or more instances of quality information to generate a graphical representation of at least a portion of the one or more instances of quality information. The apparatus comprises means for displaying the graphical representation of the one or more instances of quality information overlaid on a graphical representation of the geographic region via a user interface of the apparatus.

BRIEF DESCRIPTION OF THE DRAWINGS

Figure 1:
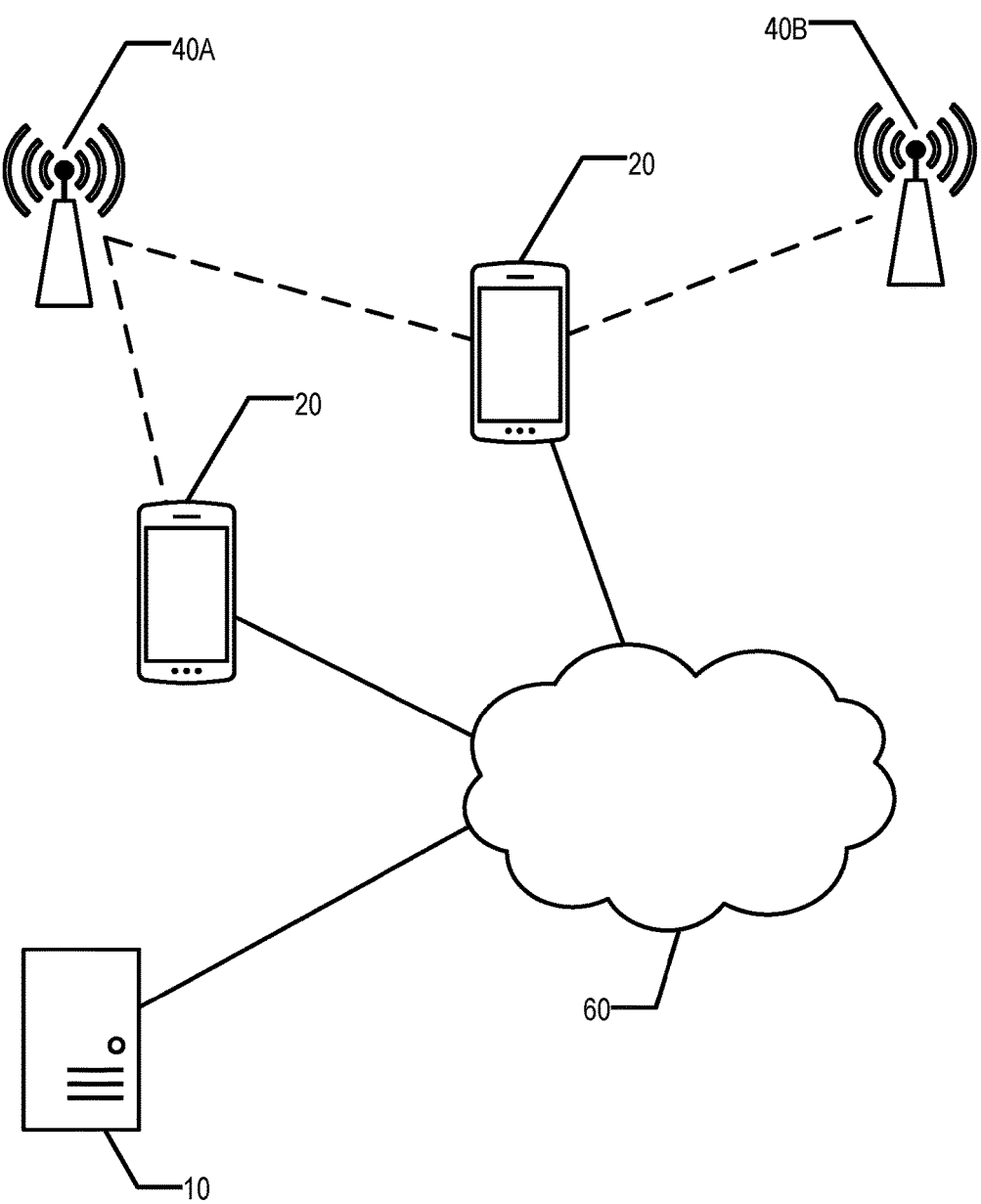
Figure 2A:
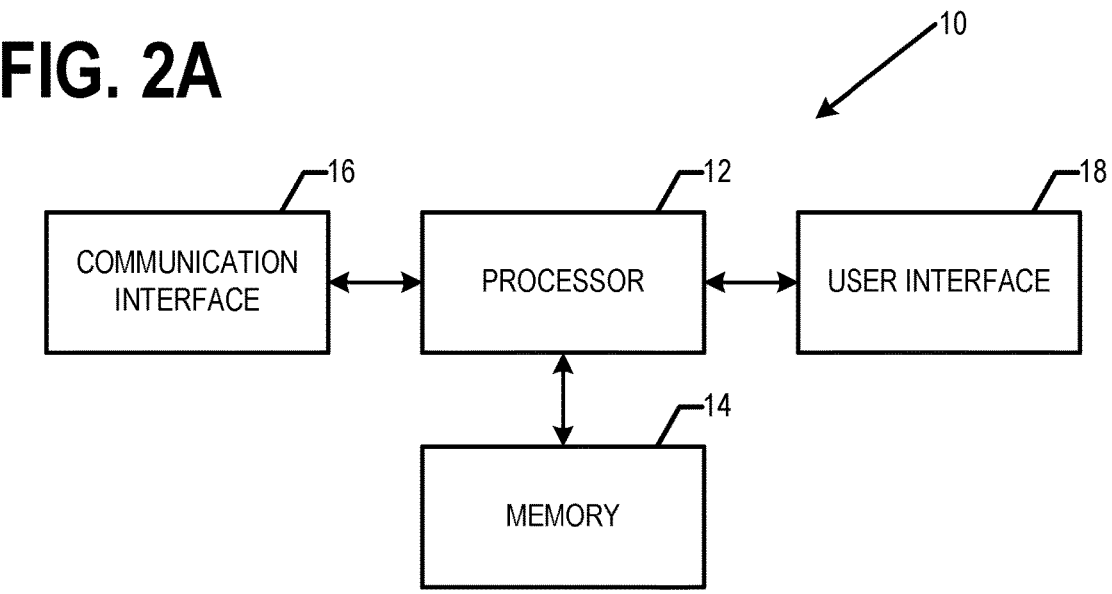
Figure 2B:
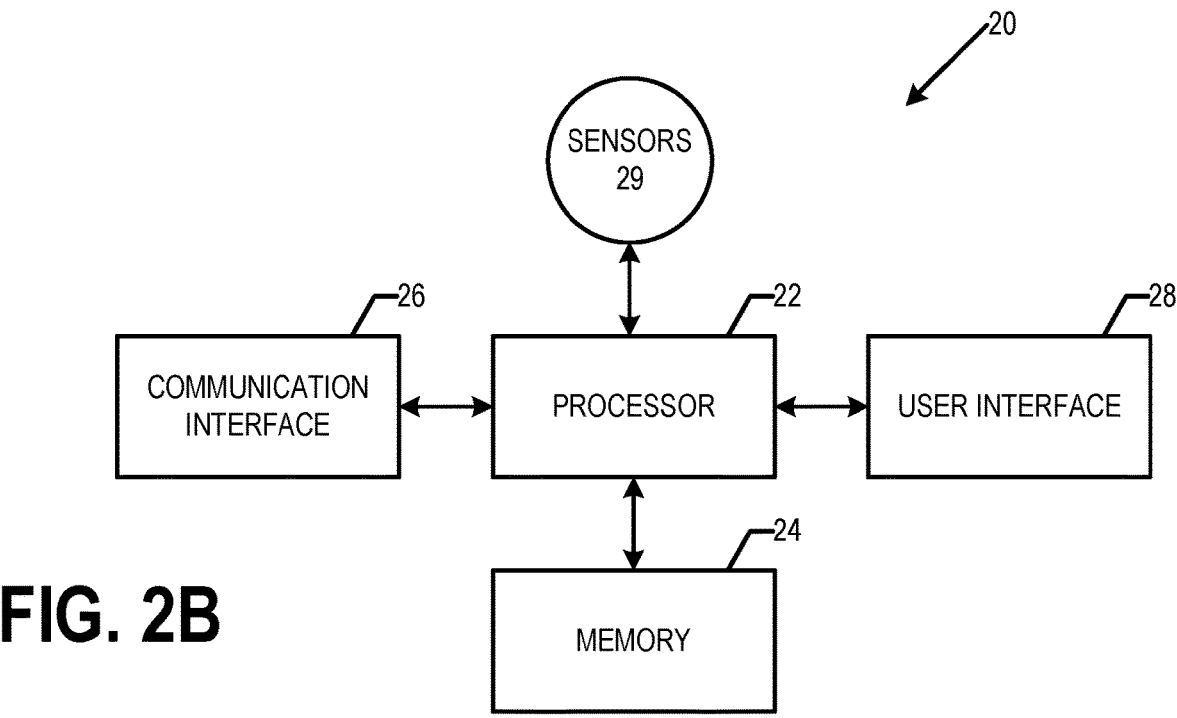
Figure 3:
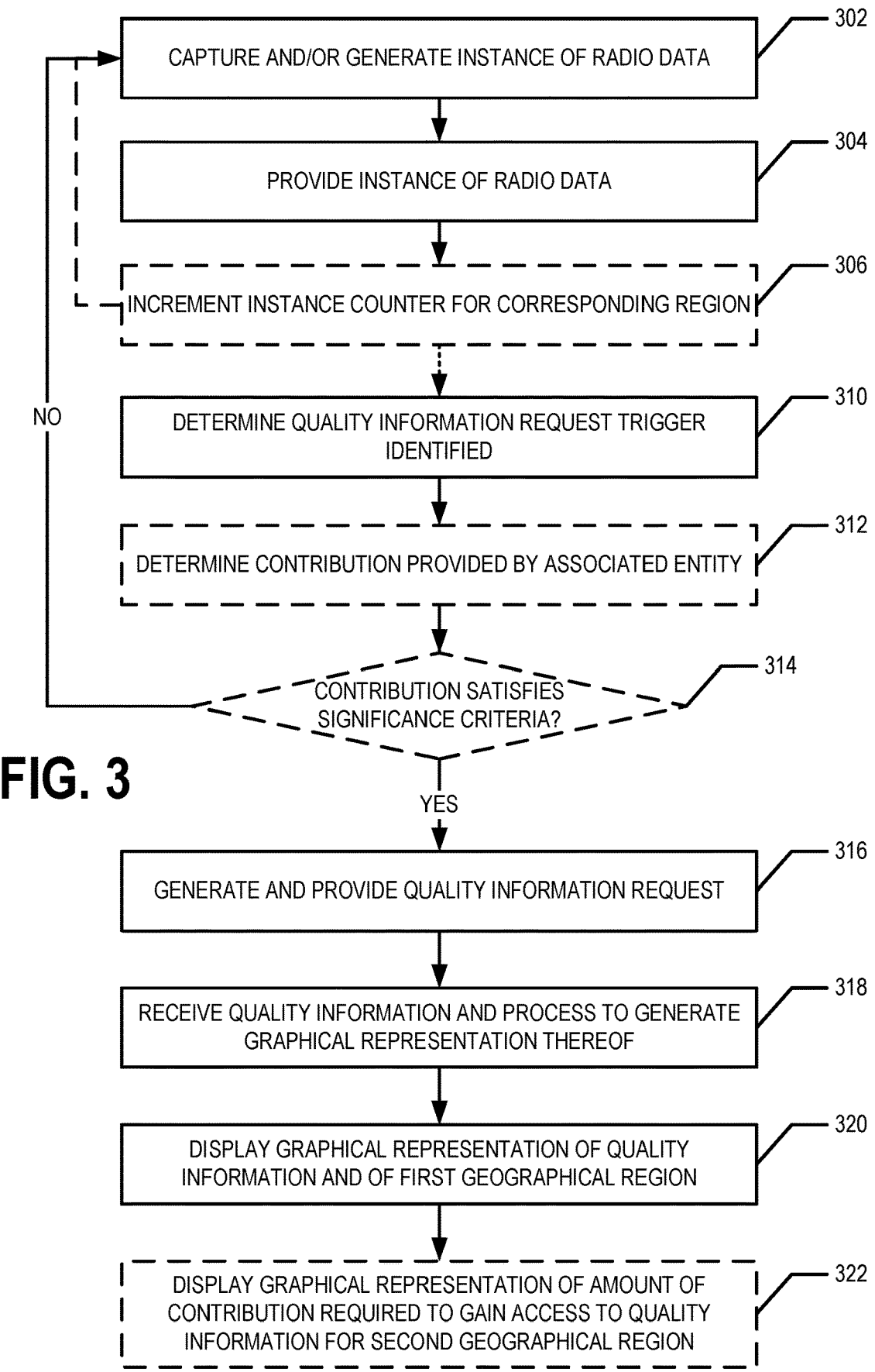
Figure 4:
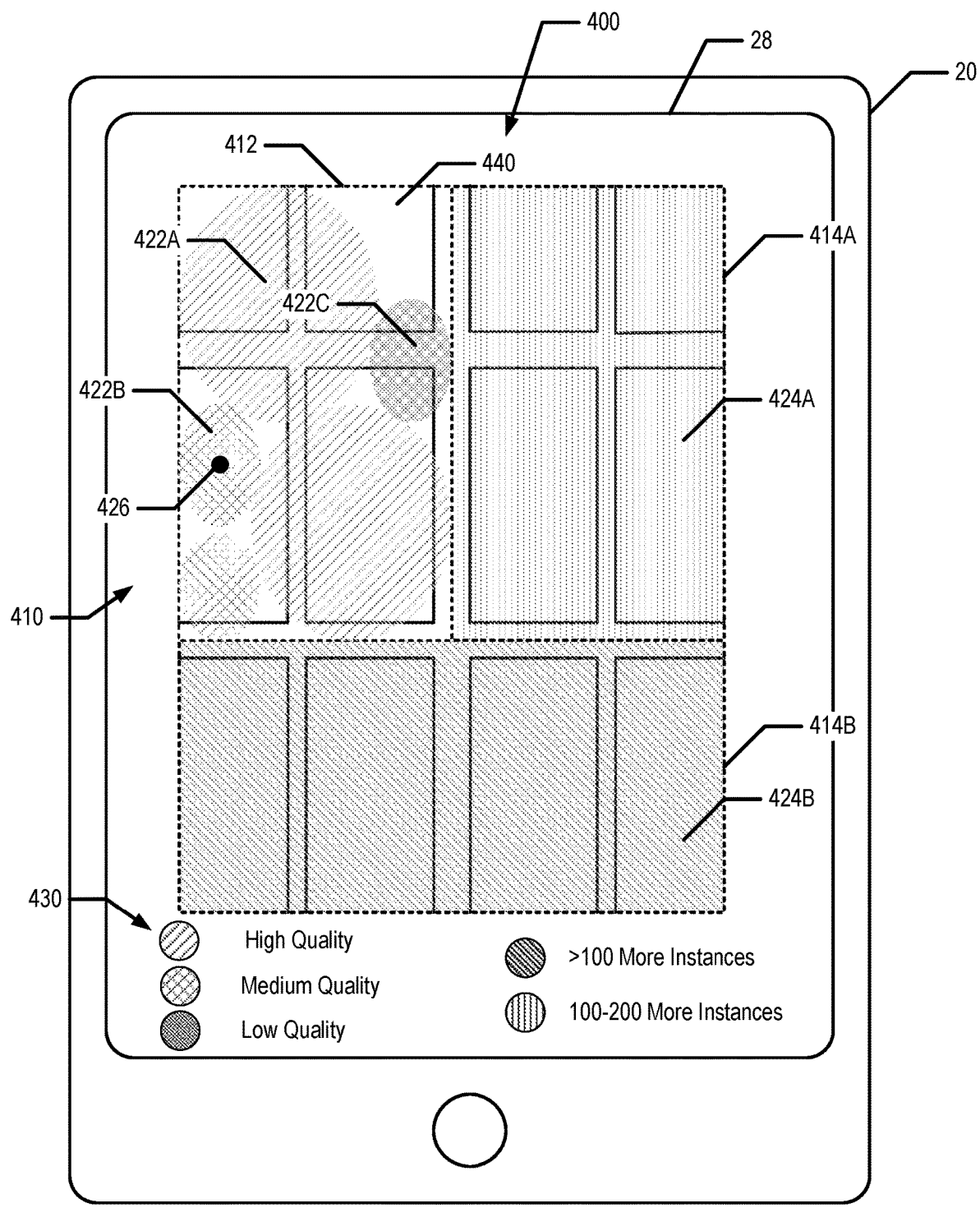
Figure 5:
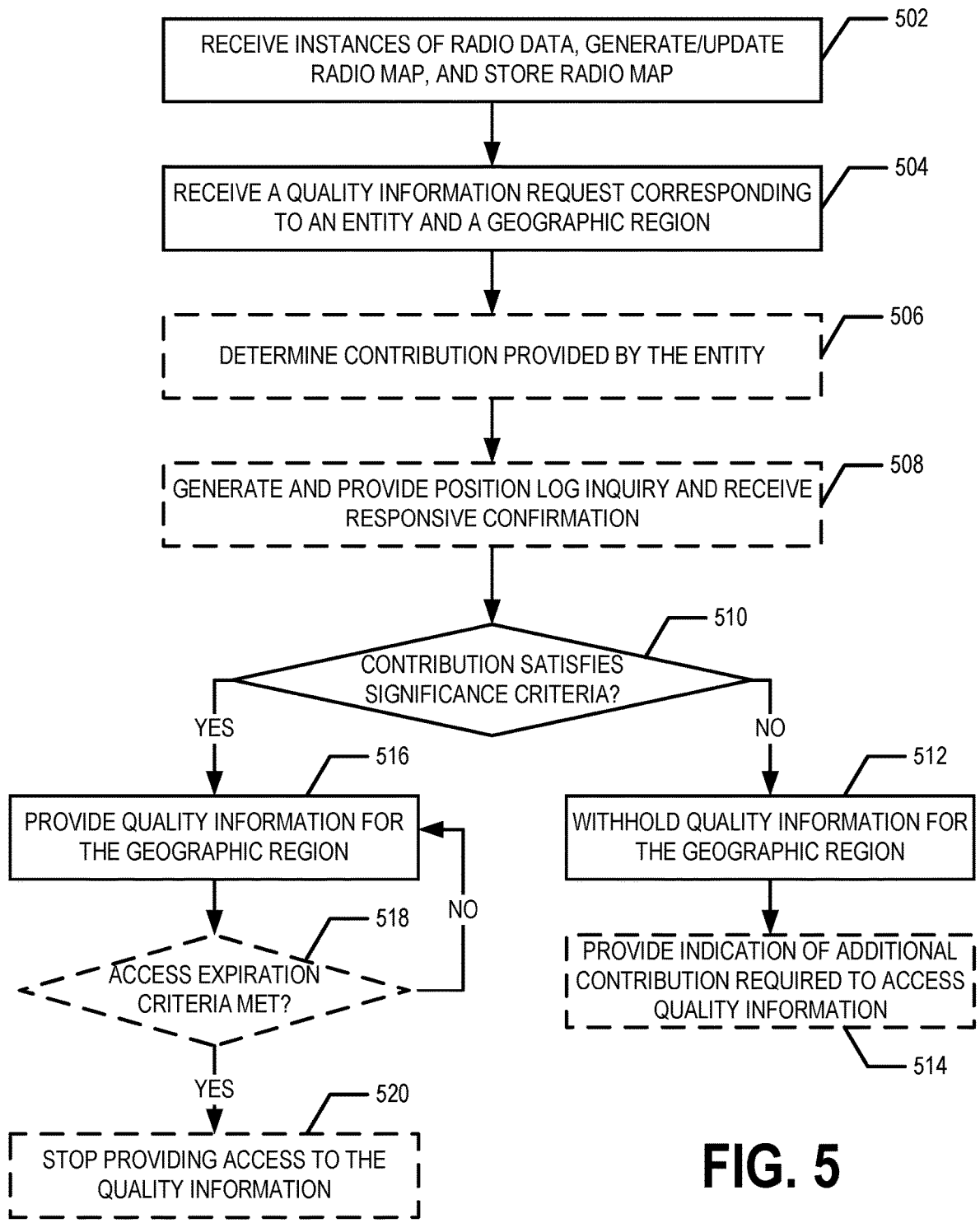
Figure 6:
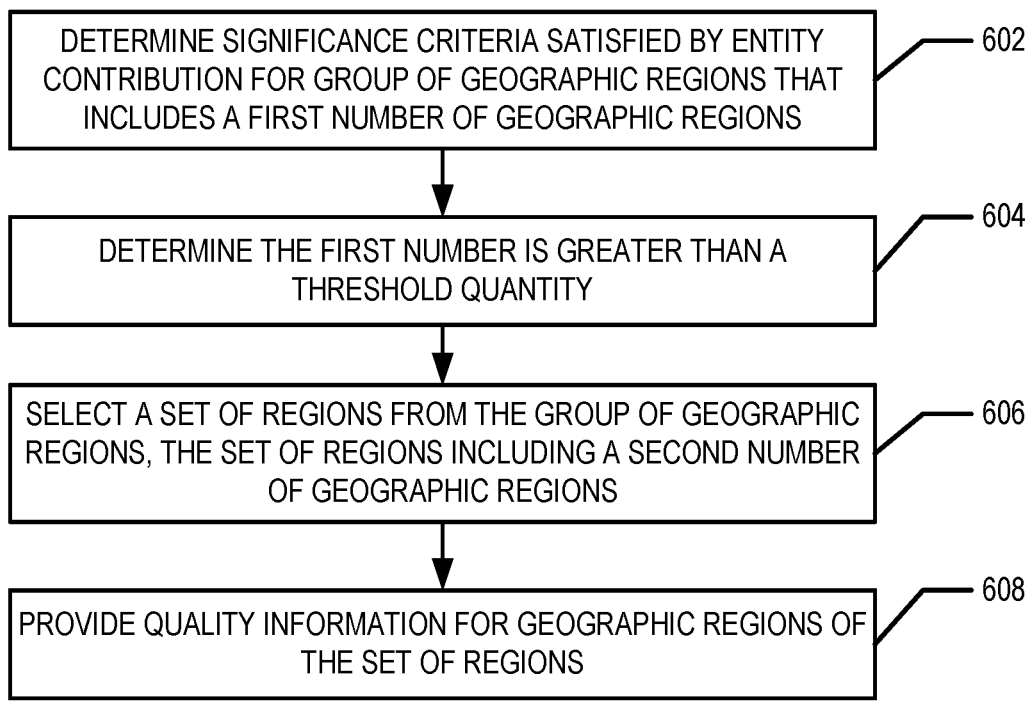

Having thus described certain example embodiments in general terms, reference will hereinafter be made to the accompanying drawings, which are not necessarily drawn to scale, and wherein:

FIG. 1 is a block diagram showing an example system of one embodiment of the present disclosure;

FIG. 2A is a block diagram of a network device that may be specifically configured in accordance with an example embodiment;

FIG. 2B is a block diagram of a user device that may be specifically configured in accordance with an example embodiment;

FIG. 3 is a flowchart illustrating operations performed, such as by the user device of FIG. 2B, in accordance with an example embodiment;

FIG. 4 is an example view of a graphical user interface provided via a user interface of the user device of FIG. 2B, in accordance with an example embodiment;

FIG. 5 is a flowchart illustrating operations performed, such as by the network device of FIG. 2A, in accordance with an example embodiment; and FIG. 6 is a flowchart illustrating operations performed, such as by the network device of FIG. 2A, in accordance with an example embodiment.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. Like reference numerals refer to like elements throughout. As used herein, the terms "data," "content," "information," and similar terms may be used interchangeably to refer to data capable of being transmitted, received and/or stored in accordance with embodiments of the present invention. As used herein, the terms "substantially" and "approximately" refer to values and/or tolerances that are within manufacturing and/or engineering guidelines and/or limits. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware.

I. General Overview

Various embodiments provide methods, apparatus, systems, and computer program products for controlling access to quality information corresponding to a radio map and/or positioning enabled by the radio map. Various embodiments provide methods, apparatus, systems, and computer program products for displaying a graphical representation of quality information.

In various embodiments, a user device associated with an entity provides instances of radio data that are used to generate and/or update the radio map. In various embodiments, the radio map is configured to enable radio-based positioning within a geographic area. In various embodiments, an instance of radio data comprises radio observation data providing information regarding access points observed by the user device at a respective position and an instance of location data providing a position estimate corresponding to the respective position. In various embodiments, a network device receives the instances of radio data, determines a respective ranking for each of the instances of radio data, and generates and/or updates the radio map based on the instances of radio data and/or the respective rankings. In various embodiments, a ranking for an instance of radio data indicates the trustworthiness of the instance of radio data and/or the likelihood that the instance of radio data is accurate and/or was manipulated (e.g., via spoofing, jamming, and/or the like).

In various embodiments, the user device generates and/or provides a quality information request corresponding to one or more particular geographic regions. Responsive to receiving and/or processing the quality information request provided by the user device, the network device determine whether a contribution made by the entity associated with the user device to a portion of map data of the radio map corresponding to the particular geographic region satisfies one or more significance criteria and/or contribution measures. In various embodiments, the user device determines whether the contribution made by the entity associated with the user device to portion of the radio map corresponding to the particular geographic region satisfies the one or more significance criteria and/or contribution measures and provides an indication of such in the quality information request. In such embodiments, the network device determines that the contribution made by the entity associated with the user device to portion of the radio map corresponding to the particular geographic region satisfies the one or more significance criteria and/or contribution measures based on processing the quality information request. In an example embodiment, the network device processes instances of radio data provided by the entity associated with the user device, information corresponding to instances of radio data provided by the entity associated with user device, (e.g., a counter, a ranking log, and/or the like), and/or other information corresponding the entity and/or the user device to determine whether the contribution made by the entity associated with the user device to portion of the radio map corresponding to the particular geographic region satisfies the one or more significance criteria and/or contribution measures.

Based on the determination of whether the contribution made by the entity to the portion of map data of the radio map corresponding to the geographic region satisfies the one or more significance criteria and/or contribution measures, quality information is either provided or withheld. For example, in various embodiments, when it is determined that the contribution provided by the entity to the portion of the map data corresponding to the geographic region satisfies the one or more significance criteria and/or contribution measures, one or more instances of quality information corresponding to respective locations located within the geographic region are provided (e.g., transmitted) for receipt by the user device. For example, in various embodiments, when it is determined that the contribution provided by the entity to the map data corresponding to the geographic region does not satisfy the one or more significance criteria and/or contribution measures, the instances of quality information corresponding to respective locations located within the geographic region are withheld from the user device. For example, access to the quality information corresponding to the geographic region may be prevented and/or denied when it is determined that the contribution provided by the entity to the map data corresponding to the geographic region does not satisfy the one or more significance criteria and/or contribution measures.

For example, in various embodiments, when the network device determines that the contribution to the portion of the map data of the radio map that corresponds to the particular geographic region satisfies the one or more significance criteria and/or contribution measures, the network device provides a message including one or more instances of quality information corresponding to locations disposed and/or located within the particular geographic region such that the user device receives the instances of quality information. In various embodiments, when the user device receives one or more instances of quality information, the user device processes the one or more instances of quality information to generate a geographical representation thereof. In an example embodiment, the user device then displays the geographical representation of the one or more instances of quality information corresponding to the particular geographic region overlaid on a graphical representation of the particular geographic region via a user interface of the user device. For example, a digital map layer providing a graphical representation of the geographic region may be displayed via the user interface of the user device and the graphical representation of the one or more instances of quality information may be displayed as another layer (e.g., an overlay layer) via the user interface.

FIG. 1 provides an illustration of an example system that can be used in conjunction with various embodiments of the present invention. As shown in FIG. 1, the system includes one or more network devices 10, one or more user devices 20, one or more networks 60, and/or the like. In an example embodiment, the network device 10 is a server, group of servers, distributed computing system, part of a cloud-based computing system, and/or other computing system. In various embodiments, a mobile device 20 is a smartphone, a tablet, a personal digital assistant (PDA), laptop, and/or the like. In an example embodiment, a user device 20 is configured to perform one or more positioning and/or navigation-related functions based on a radio map and/or a radio-based positioning estimate, generate and/or provide instances of radio data, receive and provide (e.g., display) graphical representations of instances of quality information. In various embodiments, the network device 10 communicates with one or more user devices 20 via one or more wired or wireless networks 60.

In various embodiments, the system further includes one or more access points 40 (e.g., 40A, 40B). In various embodiments, the access points 40 are wireless network access points and/or gateways such as Wi-Fi network access points, cellular network access points, Bluetooth access points, and/or other radio frequency-based network access points. In various embodiments, the access points 40 may be other radio nodes, beacons, and/or the like, such as active radio frequency identifier (RFID) tags, and/or the like.

In an example embodiment, a network device 10 may comprise components similar to those shown in the example network device 10 diagrammed in FIG. 2A. In an example embodiment, the network device 10 is configured to receive instances of radio data, determine respective rankings corresponding to the instances of radio data, and generate and/or update a radio map based on the instances of radio data and/or the respective rankings corresponding thereto. In an example embodiment, the network device 10 is configured to receive a quality information request generated and/or provided by a user device 20, determine whether the contribution to a portion of map data of the radio map provided by an entity associated with the user device 20 satisfies one or more significance criteria and/or contribution measures (e.g., based on an indication provided in the quality information request, processing the instances of radio data provided by the entity, processing the respective rankings corresponding to the instances of radio data provided by the entity, and/or the like), and, based on the determination, either (a) provide instances of quality information for receipt by the user device 20 or (b) withhold the instances of quality information from the user device 20, and/or the like.

For example, as shown in FIG. 2A, the network device 10 may comprise a processor 12, memory 14, a user interface 18, a communications interface 16, and/or other components configured to perform various operations, procedures, functions, or the like described herein. In various embodiments, the network device 10 stores a geographical database, digital map, and/or positioning map, such as a radio map, computer program code and/or instructions for performing various functions described herein, and/or the like (e.g., in memory 14), for example. In at least some example embodiments, the memory 14 is non-transitory.

In an example embodiment, the user device 20 is configured to generate and provide instances of radio data for receipt by the network device, generate and provide a quality information request, receive a message comprising either (a) an indication that access to instances of quality information is being withheld and/or denied or (b) instances of quality information corresponding to locations located and/or disposed within a particular geographic region, generate a graphical representation of the instances of quality information, provide (e.g., display) the graphical representation of the instances of quality information, possibly along with a graphical representation of the particular geographic region, and/or the like.

In an example embodiment, the user device 20 is a smartphone, tablet, laptop, PDA, navigation system, desktop computer, client device, Internet of things (IoT) device, and/or the like. In an example embodiment, as shown in FIG. 2B, the user device 20 may comprise a processor 22, memory 24, a communications interface 26, a user interface 28, one or more sensors 29 and/or other components configured to perform various operations, procedures, functions or the like described herein. In various embodiments, the user device 20 stores at least a portion of one or more digital maps (e.g., geographic databases, positioning maps, radio maps, and/or the like) and/or computer executable instructions for generating and/or providing instances of radio data, quality information requests graphical representations of quality information, and/or the like in memory 24. In at least some example embodiments, the memory 24 is non-transitory.

In various embodiments, the sensors 29 comprise one or more motion and/or IMU sensors, one or more GNSS sensors, one or more radio sensors, one or more image sensors, one or more audio sensors, and/or other sensors. In an example embodiment, the one or more motion and/or IMU sensors comprise one or more accelerometers, gyroscopes, magnetometers, barometers, and/or the like. In various embodiments, the one or more GNSS sensor(s) are configured to communicate with one or more GNSS satellites and determine GNSS-based position estimates and/or other information based on the communication with the GNSS satellites. In various embodiments, the one or more radio sensors comprise one or more radio interfaces configured to observe and/or receive signals generated and/or transmitted by one or more access points and/or other computing entities (e.g., access points 40). For example, the one or more interfaces may be configured (possibly in coordination with processor 22) to determine a locally unique identifier, globally unique identifier, and/or operational parameters of an access point 40 observed by the radio sensor(s). As used herein, a radio sensor observes an access point 40 by receiving, capturing, measuring and/or observing a signal generated and/or transmitted by the access point 40. In an example embodiment, the interface of a radio sensor may be configured to observe one or more types of signals such as generated and/or transmitted in accordance with one or more protocols such as 5G, general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. For example, the interface of a radio sensor may be configured to observe signals of one or more modern global cellular formats such as GSM, WCDMA, TD-SCDMA, LTE, LTE-A, CDMA, NB-IoT and/or non-cellular formats such as WLAN, Bluetooth, Bluetooth Low Energy (BLE), Zigbee, Lora, and/or the like. For example, the interface(s) of the radio senor(s) may be configured to observe radio, millimeter, microwave, and/or infrared wavelength signals. In an example embodiment, the interface of a radio sensor may be coupled to and/or part of a communications interface 26. In various embodiments, the sensors 29 may further comprise one or more visual sensors configured to capture visual samples, such as digital camera(s), 3D cameras, 360° cameras, and/or image sensors. In various embodiments, the one or more sensors 29 may comprise various other sensors such as two dimensional (2D) and/or three dimensional (3D) light detection and ranging (LiDAR) (s), long, medium, and/or short range radio detection and ranging (RADAR), ultrasonic sensors, electromagnetic sensors, (near-) infrared (IR) cameras. In various embodiments, the one or more sensors 29 comprise one or more audio sensors such as one or more microphones.

Each of the components of the system may be in electronic communication with, for example, one another over the same or different wireless or wired networks 60 including, for example, a wired or wireless Personal Area Network (PAN), Local Area Network (LAN), Metropolitan Area Network (MAN), Wide Area Network (WAN), cellular network, and/or the like. In an example embodiment, a network 60 comprises the automotive cloud, digital transportation infrastructure (DTI), radio data system (RDS)/high definition (HD) radio or other digital radio system, and/or the like. For example, a user device 20 may be in communication with a network device 10 via the network 60. For example, a user device 20 may communicate with the network device 10 via a network, such as the Cloud. For example, the Cloud may be a computer network that provides shared computer processing resources and data to computers and other devices connected thereto.

For example, the user device 20 provides instances of radio data and/or quality information requests such that the network device 10 receives the instances of radio data and/or quality information requests via the network 60. For example, the network device 10 provides a message comprising an indication that access to the quality information/ data is being withheld and/or denied or comprising the instances of quality information corresponding to locations located and/or disposed in a geographic region such that the user device 20 receives the message via the network 60.

Certain example embodiments of the network device 10 and user device 20 are described in more detail below with respect to FIGS. 2A and 2B.

II. Example Operation(s)

In various embodiments, a user device 20 generates and/or captures instances of radio data and provides (e.g., transmits) the instances of radio data such that a network device 10 receives the instances of radio data. In various embodiments, an instance of radio data comprises an instance of radio observation data and an instance of location data. The instance of radio observation data comprises one or more access point identifiers. Each access point identifier is configured to identify an access point 40 that was observed by the respective user device 20. The instance of radio observation data further comprises information characterizing the respective observations of the one or more access points 40 by the respective user device 20. For example, in an example embodiment, the instance of radio observation data comprises a received signal strength indicator, a one-way or round trip time for communicating with the access point, a transmission channel or frequency of the access point, a transmission interval (e.g., how frequently the access points generates, transmits, broadcasts, and/or the like a signal) and/or the like, each associated with a respective one of the one or more access point identifiers. In various embodiments, an instance of location data comprises a position estimate for the position of the user device 20 when the user device observed the one or more access points 40 identified in the corresponding instance of radio observation data. In an example embodiment, the position estimate is a GNSS-based position estimate, a radio-based position estimate, an IMU and/or motion sensor-based position estimate, a hybrid position estimate (e.g., determined based on data captured by various sensors, such as GNSS sensors and IMU and/or motion sensors, for example), and/or the like.

In various embodiments, the user device 20 is associated with an entity. In various embodiments, an entity is associated with one of (a) a single user device 20, (b) a user account associated with one or more user devices 20, or (c) a project associated with one or more user accounts (which are each associated with one or more user devices 20). For example, in an example embodiment, a user device 20 is the entity. In an example embodiment, a human user, family, group, and/or the like is the entity and the entity operates and/or is associated with one or more user devices 20 via a single user account. In an example embodiment, a group, organization, business, department of a corporation, and/or the like is the entity and the entity operates and/or is associated with a plurality of user devices 20 via a plurality of user accounts. In various embodiments, the instances of radio data generated by the user device 20 comprise a device identifier, a user account identifier, and/or an entity identifier such that the instance of radio data may be attributed to the entity. In an example embodiment where the user device 20 determines whether the contribution by the entity to the portion of map data of the radio map corresponding to a particular geographic region satisfies the one or more significance criteria and/or contribution measures and includes an indication of the determination in the quality information request and/or generates the quality information request responsive to a determining that the one or more significance criteria and/or contribution measures are satisfied, the instances of radio data may not include a device identifier, user account identifier, and/or entity identifier.

In various embodiments, the network device 10 receives the instances of radio data. In an example embodiment, the network device 10 processes the instances of radio data to determine a ranking for each instance of radio data and/or for a batch of instances of radio data (e.g., a plurality of instances of radio data provided by a same user device in a time period and/or within a particular distance of one another). In various embodiments, a ranking for an instance of radio data indicates the trustworthiness of the instance of radio data and/or the likelihood that the instance of radio data is accurate and/or was manipulated (e.g., via spoofing, jamming, and/or the like). Various techniques are used to determine a ranking for an instance of radio data and/or a batch of instances of radio data in various embodiments, such as machine learning trained models, consistencies and/or inconsistencies between instances of radio data, clustering methods, and/or the like. In an example embodiment, the instances of radio data are stored in association with a corresponding ranking.

In an example embodiment, a counter stored in a profile (stored by and/or accessible to the network device 10) corresponding to the entity associated with the user device, a user account associated with the user device, and/or the user device is updated to include a number of instances of radio data provided by the user device 20, a user associated with the user account, and/or user devices 20 associated with the entity. In an example embodiment, the number of instances of radio data reflects and/or corresponds to the number of instances of radio data provided by the user device 20 and/or in association with the user account and/or entity that received a ranking that satisfied a ranking threshold. For example, in various embodiments, a ranking satisfies the ranking threshold when the ranking indicates that it is likely (e.g., with a probability of at least 50%, 60%, 70%, 75%, 80%, 85%, 90%, 95%, 99%) that the instance of radio data is accurate, provided in good faith, and/or is not manipulated (e.g., via spoofing, jamming, and/or the like). For example, an instance of radio data associated with a ranking that satisfies the ranking threshold may be used to generate and/or update the radio map. In an example embodiment, an instance of radio data associated with a ranking that does not satisfy the ranking threshold is not used to generate and/or update the radio map. The network device 10 then uses the instances of radio data (e.g., the instances of radio data determined to have respective rankings that satisfy the ranking threshold) to generate and/or update the radio map.

In various embodiments, the radio map is configured to enable radio-based positioning in a geographic area. For example, the radio map comprises map data that may be used by a network device 10, a computing device (e.g., a user device 20), Cloud-based positioning system, and/or the like for determining a position estimate for the computing device based on observations of access points captured by the computing device. For example, in an example embodiment, the radio map comprises location estimates of the location of one or more access points 40 indexed by and/or in association with respective access point identifiers. In an example embodiment, an access point identifier is and/or comprises a cell identifier, MAC address, and/or the like for the corresponding access point 40. In an example embodiment, the radio map comprises transmitting information characterizing and/or estimating the transmission parameters of one or more access points 40. In an example embodiment, the transmission parameters of an access point 40 include the transmission channel and/or frequency, transmission power, transmission interval, and/or the like. In various embodiments, the radio map comprises a radio model for an access point 40 indicating measurements characterizing observations of the access point 40 by one or more user devices at one or more observation locations, a coverage area of the access point within which it is expected that user devices 20 can observe the access point with a signal strength above a threshold strength, a model of how signals transmitted by the access point 40 propagate through the surrounding space that can be used to determine an expected observed signal strength at one or more locations, and/or the like.

At some point, a user device 20 determines that a quality information request trigger has been identified. In an example embodiment, the user device 20 determines whether the contribution, by the user device 20 and/or a corresponding entity, to the portion of map data of the radio map corresponding to a particular geographic region (e.g., the geographic region within which the user device 20 is currently located, a geographic region that is commonly frequented by the user device 20, a geographic region within which the user device 20 is expected to be located in with an particular time period, a geographic region corresponding to a geographic location selected by the user via a user interface, and/or the like) satisfies one or more significance criteria and/or contribution measures and/or for which geographic regions located and/or disposed within the geographic area corresponding to the radio map the contribution, by the user device 20 and/or a corresponding entity, to the respective portions of map data satisfies one or more significance criteria and/or contribution measures. In an example embodiment, this determination is performed responsive to determining that the quality information request trigger was identified. In an example embodiment, when it is determined that the contribution, by the user device 20 and/or a corresponding entity, to the portion of map data of the radio map corresponding to a particular geographic region satisfies one or more significance criteria and/or contribution measures, the user device 20 generates the quality information request indicating the particular geographic region. In an example embodiment, when it is determined that the contribution, by the user device 20 and/or a corresponding entity, to the respective portions of map data corresponding to one or more geographic regions satisfies one or more significance criteria and/or contribution measures, the user device 20 generates the quality information request indicating at least one of the one or more geographic regions. In an example embodiment, the user device 20 determines that the contribution provided by the user device 20 and/or a corresponding entity does not satisfy the one or more significance criteria and/or contribution measures and a quality information request is not generated in response to determining that the quality information request trigger was identified. In an example embodiment, the user device 20 does not make a determination regarding whether a contribution by the user device 20 and/or a corresponding entity satisfies the one or more significance criteria and/or contribution measures (e.g., the determination is made by the network device 10).

In various embodiments, the quality information request comprises an indication of one or more geographic regions within the geographic area corresponding to the radio map for which quality information is being requested, a device identifier and/or an entity identifier for an entity with which the user device 20 is associated, and/or the like. In an example embodiment, the quality information request comprises an indication that the user device 20 has determined that the contribution by the user device 20 and/or a corresponding entity to the respective portions of map data of the radio map corresponding to the one or more geographic regions indicated by the quality information request each satisfy one or more significance criteria and/or contribution measures. The user device 20 provides (e.g., transmits via one or more wired and/or wireless networks 60) the quality information request such that the network device 10 receives the quality information request.

In various embodiments, the network device 10 receives the quality information request. Responsive to processing the quality information request, the network device 10 determines whether the contribution by the user device 20 and/or a corresponding entity to the respective portions of map data of the radio map corresponding to the one or more geographic regions (e.g., indicated by the quality information request, in various embodiments) respectively and/or individually satisfy one or more significance criteria and/or contribution measures. In an example embodiment, the network device 10 makes this determination via processing of the quality information request. In an example embodiment, the network device 10 determines the contribution by the user device 20 and/or a corresponding entity to respective portions of map data respectively corresponding to one or more geographic regions by processing instances of radio data; accessing a counter and/or ranking log stored as part of profile information associated with a user account and/or an entity; and/or the like. The network device 10 then determines whether the determined contribution by the user device 20 and/or the corresponding entity to the respective portions of map data respectively corresponding to one or more geographic regions respectively and/or individually satisfy the one or more significance criteria and/or contribution measures.

In various embodiments, the significance criteria and/or contribution measures correspond to a volume of contribution by the user device 20 and/or the corresponding entity and/or a quality of the contribution by the user device 20 and/or the corresponding entity. In an example embodiment, the significance criteria and/or contribution measures indicates a time period for which the contribution is considered. For example, the contribution within a sliding time window corresponding to the past twenty-four hours, the past week, the past month, the past three months, the past six months, the past year, and/or another time period may be determined and/or considered. For example, if an entity provided a large volume and/or a high quality contribution to a portion of map data corresponding to a particular geographic region in the past, but has provided a low volume and/or low quality contribution to the portion of map data corresponding to the particular geographic region within the sliding time window, the entity's contribution to the portion of the map data corresponding the geographic region is determined to not satisfy the one or more significance criteria and/or contribution measures. However, if the entity provides a large volume and/or a high quality contribution to the portion of map data corresponding to the particular geographic region during the sliding time window, the entity's contribution to the portion of the map data corresponding the geographic region is determined to satisfy the one or more significance criteria and/or contribution measures. What constitutes high volume, low volume, high quality, and/or low quality is defined by the significance criteria and/or contribution measures, in various embodiments.

Based on the determination of whether the contribution made by the user device 20 and/or corresponding entity to the portion of map data of the radio map corresponding to a particular geographic region satisfies the one or more significance criteria and/or contribution measures, access to quality information is either provided or withheld/denied. For example, in various embodiments, when the network device 10 determines that the contribution provided by the entity to the portion of the map data corresponding to the geographic region satisfies the one or more significance criteria and/or contribution measures, the network device 10 provides (e.g., transmits) one or more instances of quality information corresponding to respective locations located within the particular geographic for receipt by the user device 20. For example, in various embodiments, when the network device 10 determines that the contribution provided by the entity to the map data corresponding to the particular geographic region does not satisfy the one or more significance criteria and/or contribution measures, the instances of quality information corresponding to respective locations located within the geographic region are withheld from the user device 20 (e.g., not transmitted for receipt by the user device 20). For example, access to the quality information corresponding to the geographic region may be prevented and/or denied when the network device 10 determines that the contribution provided by the entity to the portion of map data corresponding to the particular geographic region does not satisfy the one or more significance criteria and/or contribution measures.

For example, in various embodiments, when the network device 10 determines that the contribution to the portion of the map data of the radio map that corresponds to the particular geographic region satisfies the one or more significance criteria and/or contribution measures, the network device 10 provides (e.g., transmits) a message including one or more instances of quality information corresponding to locations disposed and/or located within the particular geographic region such that the user device 20 receives the instances of quality information. In various embodiments, when the user device 20 receives one or more instances of quality information, the user device 20 processes the one or more instances of quality information to generate a geographical representation thereof. In an example embodiment, the user device 20 then displays the geographical representation of the one or more instances of quality information corresponding to the particular geographic region overlaid, for example, on a graphical representation of the particular geographic region via a user interface 28 of the user device 20. For example, a digital map layer providing a graphical representation of the geographic region may be displayed via the user interface 28 of the user device 20 and the graphical representation of the one or more instances of quality information may be displayed as another layer (e.g., an overlay layer) via the user interface 28.

A. Exemplary Operation of a User Device

FIG. 3 provides a flowchart illustrating various processes, procedures, operations, and/or the like performed by a user device 20, in accordance with various embodiments. Starting at block 302, the user device 20 captures and/or generates instances of radio data. For example, the user device 20 comprises means, such as processor 22, memory 24, sensors 29, and/or the like, for generating and/or capturing instances of radio data. In various embodiments, an instance of radio data comprises an instance of radio observation data and an instance of location data corresponding to observation of one or more access points 40 by the user device 20 while located at a location indicated by the instance of location data. The instance of radio observation data comprises one or more access point identifiers. Each access point identifier is configured to identify an access point 40 that was observed by the respective user device 20. The instance of radio observation data further comprises information characterizing the respective observations of the one or more access points 40 by the respective user device 20. For example, in an example embodiment, the instance of radio observation data comprises a received signal strength indicator, a one-way or round trip time for communicating with the access point, a transmission channel or frequency of the access point, a transmission interval (e.g., how frequently the access points generates, transmits, broadcasts, and/or the like a signal) and/or the like, each associated with a respective one of the one or more access point identifiers. In various embodiments, an instance of location data comprises a position estimate for the position of the user device 20 when the user device observed the one or more access points 40 identified in the corresponding instance of radio observation data. In an example embodiment, the position estimate is a GNSS-based position estimate, a radio-based position estimate, an IMU and/or motion sensor-based position estimate, a hybrid position estimate (e.g., determined based on data captured by various sensors, such as GNSS sensors and IMU and/or motion sensors, for example), and/or the like.

At step/operation 304, the user device 20 provides the instances of radio data. For example, the user device 20 provides (e.g., transmits) the instances of radio data such that the network device 10 receives the instances of radio data. For example, the user device 20 comprises means, such as processor 22, memory 24, communication interface 26, and/or the like, for providing the instances of radio data. In an example embodiment, a device identifier configured to identify the user device 20, a user identifier configured to identify a user account associated with the user device 20, and/or an entity identifier configured to identify an entity associated with the user device is provided in association with the instances of radio data.

At step/operation 306, the user device 20 increments one or more counters to indicate that the instances of radio data have been provided. In various embodiments, each counter is corresponds to a respective geographic region. For example, the user device 20 may store a counter corresponding to a particular geographic region. When the user device 20 provides an instance of radio data including an instance of location data indicating a location within the particular geographic region, the user device 20 may increment the counter corresponding to the particular geographic region. In various embodiments, the counter corresponds to a sliding time window. For example, the counter corresponding to the particular geographic region indicates the number of instances of radio data provided by the user device 20 that include instances of location data indicating locations within the particular geographic region within the sliding time window (e.g., the last twenty-four hours, the past week, the past month, the past three months, the past six months, the past year, and/or the like). For example, the user device 20 may comprise means, such as processor 22, memory 24, and/or the like, for incrementing a counter to indicate that an instance of radio data has been provided.

At some point in time, the user device 20 determines that a quality information request trigger has been identified, at step/operation 310. For example, the user device 20 may comprise means, such as processor 22, memory 24, communications interface 26, user interface 28, sensors 29, and/or the like, for determining that a quality information request trigger has been identified. In an example embodiment, the quality information request trigger is identified responsive to processing user input received via the user interface 28 of the user device 20. For example, a user operating the user device 20 may select and/or interact with a selectable user interface element via the user interface 28 configured to cause a quality information request trigger to be identified. In an example embodiment, the quality information request trigger is identified responsive to the user device 20 determining that the user device is located near a particular geographic location (e.g., within a threshold distance of), located within a particular geographic region, and/or the like. In an example embodiment, the quality information request trigger is identified responsive to particular clock value being identified (e.g., a particular date and/or time) and/or a particular amount of time having passed since the last quality information request trigger was identified. In an example embodiment, the quality information request trigger is identified responsive to a counter stored by the user device 20 and corresponding to a particular geographic region reaching and/or surpassing a particular value. A variety of techniques for identifying a quality information request trigger may be employed in various embodiments. In an example embodiment, the quality information request trigger identifies one or more particular geographic regions (e.g., the geographic region within which the user device 20 is currently located, a geographic region that is commonly frequented by the user device 20, a geographic region within which the user device 20 is expected to be located in with an particular time period, a geographic region corresponding to a geographic location selected by the user via a user interface, and/or the like).

At step/operation 312, in various embodiments, the user device 20 determines the contribution, by the user device 20 and/or an entity associated therewith, to the respective portions of the map data corresponding to the respective one or more particular geographic regions. For example, the user device 20 may comprise means, such as processor 22, memory 24, and/or the like, for determining the contribution, by the user device 20 and/or an entity associated therewith, to the respective portions of the map data corresponding to the respective one or more particular geographic regions. For example, the user device 20 may store a counter that indicates the number of instances of radio data the user device 20 has provided during a sliding time window that comprise instances of location data that indicate locations located within a particular geographic region. The user device 20 may determine the user device's and/or the corresponding entity's contribution to the portion of the map data corresponding to the particular geographic region by accessing the corresponding counter (e.g., from memory 24).

At step/operation 314, the user device 20 determines whether the user device's 20 and/or corresponding entity's contribution to the portion of the map data satisfies the one or more significance criteria and/or contribution measures. For example, the user device 20 may comprise means, such as processor 22, memory 24, and/or the like, for determining whether the user device's 20 and/or corresponding entity's contribution to the portion of the map data satisfies the one or more significance criteria and/or contribution measures. In an example embodiment, the user device 20 determines that the user device's 20 and/or corresponding entity's contribution to the portion of the map data satisfies the one or more significance criteria and/or contribution measures when the counter has value at least as large as and/or greater than a threshold number of instances of radio data. For example, the one or more significance criteria and/or contribution measures may comprise and/or define a threshold number of instances of radio data. When the counter corresponding to a particular geographic region has a value that is at least as large as and/or greater than the threshold number of instances of radio data defined by the significance criteria and/or contribution measures, the user device's 20 and/or the corresponding entity's contribution to the portion of the map data corresponding to the particular geographic region is determined to satisfy the significance criteria and/or contribution measures. Various other techniques may be used to determine whether the user device's 20 and/or the corresponding entity's contribution to the portion of the map data corresponding to the particular geographic region satisfies the one or more significance criteria and/or contribution measures, as appropriate for the application.

In various embodiments, when the user device 20 determines that the user device's 20 and/or the corresponding entity's contribution to the portion of the map data corresponding to the particular geographic region does not satisfy the one or more significance criteria and/or contribution measures, the user device 20 does not generate a quality information request in response to determining that the quality information request trigger was identified. In various embodiments, when the user device 20 determines that the user device's 20 and/or the corresponding entity's contribution to the portion of the map data corresponding to the particular geographic region does satisfy the one or more significance criteria and/or contribution measures, the user device 20 generates and provides a quality information request at step/operation 316. For example, the user device 20 may comprise means, such as processor 22, memory 24, communication interface 26, and/or the like, for generating and providing a quality information request. For example, the user device 20 may provide (e.g., transmit) the quality information request such that the network device 10 receives the quality information request (e.g., via network 60).

In various embodiments, the quality information request comprises an indication of one or more geographic regions within the geographic area corresponding to the radio map for which quality information is being requested, a device identifier, user account identifier configured to identify a user account, and/or an entity identifier configured to identify an entity with which the user device 20 is associated, and/or the like. In an example embodiment, the quality information request comprises an indication that the user device 20 has determined that the contribution by the user device 20 and/or a corresponding entity to the respective portions of map data of the radio map corresponding to the one or more geographic regions indicated by the quality information request each satisfy the one or more significance criteria and/or contribution measures.

At step/operation 318, the user device 20 receives a message comprising quality information and processes the quality information to generate a graphical representation thereof. For example, the user device 20 may comprise means, such as processor 22, memory 24, communications interface 26, user interface 28, and/or the like, for receiving a message comprising quality information and for processing the quality information to generate a graphical representation thereof. In an example embodiment, the message comprises one or more instances of quality information that correspond to respective locations located and/or disposed within a first geographic region indicated in the quality information request.

In an example embodiment, the one or more instances of quality information are configured to indicate at least one of (a) a quality of infrastructure, (b) a quality of learning, or (c) a quality of positioning enabled at the respective location within the geographic region. In various embodiments, the quality of the infrastructure indicates a number of access points 40 having coverage areas and/or broadcast areas that include the respective location, whether the number of access points 40 having coverage areas and/or broadcast areas that include the respective location is sufficient to enable accurate radio-based positioning, and/or the like. In various embodiments, the quality of learning indicates whether enough instances of radio data have been collected for all and/or enough of the access points 40 that have been observed at or near the location to enable reliable and/or accurate modeling. For example, the quality of learning associated with a particular location is an indication of how well the radio map is believed to represent the radio environment observable at the particular location. In various embodiments, the quality of positioning enabled at the respective location provides an indication of how accurate radio-based positioning enabled by the radio map at or near the respective location is. The quality of positioning is a combination of the quality of infrastructure and the quality of learning as accurate radio-based positioning requires both sufficient infrastructure (e.g., a sufficient number of access points 40 that are observable) and sufficient modeling, understanding, and/or knowledge of that infrastructure.

In various embodiments, the user device 20 generates a geographical representation of the one or more instances of quality information. For example, the geographical representation may be a layer of a digital map, an infographic, a table, an image, and/or the like that may be displayed via a user interface 28. In an example embodiment, an audible representation of the one or more instances of quality information is generated and/or prepared to be provided via a speaker of the user interface 28.

At step/operation 320, the user device 20 displays the graphical representation of one or more instances of quality information corresponding to locations disposed and/or located in the first geographic region and a graphical representation of the first geographic region. For example, the user device 20 may comprise means, such as processor 22, memory 24, user interface 28, and/or the like, for displaying the graphical representation of the one or more instances of quality information corresponding to locations disposed and/or located in the first geographic region and a graphical representation of the first geographic region.

For example, FIG. 4 provides an example user interface view 400 of a user interface 28 of the user device 20 comprising a graphical representation portion 410 and a legend portion 430. The graphical representation portion 410 provides a graphical representation 440 of the first geographic region 412 and geographical representations 422 (e.g., 422A, 422B, 422C) of various instances of quality information corresponding to respective locations, such as a location 426 to which graphical representation 422B corresponds. As shown, the graphical representation portion 410 may further comprise graphical representations of one or more second geographic regions 414A, 414B. The user device's 20 and/or the corresponding entity's contribution to the respective portions of map data corresponding to each of the second geographic regions did not satisfy the one or more significance criteria and/or contribution measures. Thus, a graphical representation of quality information for the second geographic regions 414A, 414B is not displayed. In an example embodiment, the quality information request identified the first and second geographic regions.

In an example embodiment, the graphical representation of quality information for the first geographic region includes three-dimensional quality information. For example, the quality information may include information corresponding to different floors and/or levels of a building and/or venue located within the first geographic region. For example, the user interface 28 may display and/or provide a component via interaction with which a user may select a floor index and/or altitude level to cause the graphical representation of the quality information corresponding to that floor index and/or altitude level (within the first geographic region) to be displayed. In another example, the first geographic region may correspond to a particular floor of a building and/or venue.

Continuing with FIG. 3, at step/operation 322, in various embodiments, the user device 20 displays a graphical representation of the amount of contribution required for the user device 20 and/or the corresponding entity to gain access to quality information for a second geographic region. For example, the message received at step/operation 318 may include an indication of the amount of contribution required for the user device 20 and/or the corresponding entity to gain access to quality information for a second geographic region. In an example embodiment, the user device 20 may determine the amount of contribution required for the user device 20 and/or the corresponding entity to gain access to quality information for the second geographic region based on a counter stored by the user device 20 and corresponding to the second geographic region and the one or more significance criteria and/or contribution measures. The indication of the amount of contribution may be provided as an number of instances of radio, a percentage (e.g., 75% of the required contribution has been already been contributed!), and/or the like. The user device 20 may generate a graphical representation of the amount of contribution required for the user device 20 and/or the corresponding entity to gain access to quality information for a second geographic region and may display the geographical representation. For example, FIG. 4 illustrates graphical representations 424A, 424B of the amount of contribution required for the user device 20 and/or the corresponding entity to gain access to quality information for a second geographic region. In an example embodiment, a time period (e.g., based on a sliding time window associated with the counter) within which user device 20 must provide the amount of contribution required for the user device 20 and/or the corresponding entity to gain access to quality information for the second geographic region is also provided, determined, and/or displayed. A graphical representation of the second geographic region may also be displayed via the user interface view 400.

B. Exemplary Operation of a Network Device

FIG. 5 provides a flowchart illustrating various processes, procedures, operations, and/or the like performed by a network device 10, in accordance with various embodiments. Starting at block 502, the network device 10 receives instances of radio data provided by one or more user devices 20, generates and/or updates a radio map based on the received instances of radio data, and stores the radio map. For example, the network device 10 comprises means, such as processor 12, memory 14, communication interface 16, and/or the like, for receiving instances of radio data, generating and/or updating a radio map based on the received instances of radio data, and storing the radio map. As described above, an instance of radio data comprises an instance of radio observation data characterizing the observation of one or more access points 40 by the user device 20 that generated the instance of radio data and an instance of location data that indicates a location of the user device 20 when the one or more access points 40 were observed. In various embodiments, the radio map is configured to enable radio-based positioning within a geographic area comprising one or more geographic regions.

In an example embodiment, an instance of radio data are processed to determine a ranking indicating a trustworthiness of the instance of radio data and/or the likelihood that the instance of radio data is accurate and/or was manipulated (e.g., via spoofing, jamming, and/or the like). Various techniques are used to determine a ranking for an instance of radio data and/or a batch of instances of radio data in various embodiments, such as machine learning trained models, consistencies and/or inconsistencies between instances of radio data, clustering methods, and/or the like. In an example embodiment, the instances of radio data are stored in association with a corresponding ranking. For example, an instance of radio data associated with a ranking that satisfies a ranking threshold may be used to generate and/or update the radio map. In an example embodiment, an instance of radio data associated with a ranking that does not satisfy the ranking threshold is not used to generate and/or update the radio map. For example, in various embodiments, a ranking satisfies the ranking threshold when the ranking indicates that it is likely (e.g., with a probability of at least 50%, 60%, 70%, 75%, 80%, 85%, 90%, 95%, 99%) that the instance of radio data is accurate, provided in good faith, and/or is not manipulated (e.g., via spoofing, jamming, and/or the like).

In various embodiments, the network device 10 stores (e.g., in profile database and/or the like) and/or maintains (e.g., updates based on received instances of radio data and/or the like) a plurality of counters each corresponding to a respective user device 20, user account, and/or entity and corresponding to a respective geographic region. In various embodiments, a counter indicates a number of instances of radio data provided by a user device 20, possibly in association with a corresponding user account and/or in association with a corresponding entity, comprising instances of location information indicating locations located within a corresponding geographic region. In an example embodiment, a counter indicates a number of instances of radio data provided by a user device 20, possibly in association with a corresponding user account and/or in association with a corresponding entity, comprising instances of location information indicating locations located within a corresponding geographic region provided within a sliding time window (e.g., within the last twenty-four hours, the past week, the past month, the past three months, the past six months, the past year, and/or the like) and/or that satisfy the ranking threshold. In an example, the network device 10 stores an entity status in association with a counter (e.g., in association with an entity identifier and/or a geographic region). The entity status for a geographic region is determined based at least in part on the rankings determined for the instances of radio data provided by one or more user devices 20 associated with the entity that comprise instances of location data that indicate locations located and/or disposed within the geographic region, in various embodiments. In an example embodiment, the entity status for a geographic region is determined based at least in part on the rankings determined for the instances of radio data provided by one or more user devices 20 associated with the entity within the sliding time window and that comprise instances of location data that indicate locations located and/or disposed within the geographic region.

In various embodiments, the radio map is a shared radio map. In various embodiments, a shared radio map is a radio map for which a plurality of computing devices (e.g., network devices 10, user devices 20, and/or other computing devices such as Cloud-based positioning services, and/or the like) associated, collectively, with a plurality of user accounts and/or a plurality of entities, store and/or use at least a portion of the radio map. For example, in various embodiments, the radio map is a shared radio map that is generated, maintained, and/or updated based on crowd-sourced radio data. In an example embodiment, the radio map is a private radio map that is stored and/or used by only one network device 10 and/or user device 10 and/or only by network devices 10 and/or user devices 20 associated with a single user account and/or a single entity.

At step/operation 504, the network device 10 receives a quality information request. For example, the network device 10 comprises means, such as processor 12, memory 14, communication interface 16, and/or the like, for receiving a quality information request. In various embodiments, the quality information request comprises an indication of one or more geographic regions within the geographic area corresponding to the radio map for which quality information is being requested; a device identifier configured to identify the user device 20 that generated the quality information request, user account identifier configured to identify a user account with which the user device 20 is associated, and/or an entity identifier configured to identify an entity with which the user device 20 is associated; and/or the like. In an example embodiment, the quality information request comprises an indication that the user device 20 has determined that the contribution by the user device 20 and/or a corresponding entity to the respective portions of map data of the radio map corresponding to the one or more geographic regions indicated by the quality information request each satisfy the one or more significance criteria and/or contribution measures.

At step/operation 506, the network device 10, responsive to receiving and/or processing the quality information request, determines a contribution provided by the user device 20 and/or the corresponding entity (e.g., as identified by the quality information request) to the portion of map data corresponding to a geographic region (e.g., indicated by the quality information request). For example, the network device 10 may comprise means, such as processor 12, memory 24, and/or the like for determining a contribution provided by the user device 20 and/or the corresponding entity (e.g., as identified by the quality information request) to the portion of map data corresponding to a geographic region (e.g., indicated by the quality information request). In various embodiments, the quality information request indicates that the contribution provided by the user device 20 and/or the corresponding entity to the portion of map data corresponding to the geographic region satisfies the one or more significance criteria and/or contribution measures, and the network device 10 does not determine the contribution. For example, the network device 10 may access (e.g., from memory 14) a counter associated with the user device 20 and/or the corresponding entity and corresponding to the geographic region. In an example embodiment, the network device 10 may access (e.g., from memory 14) an entity status associated with the user device 20 and/or the corresponding entity and corresponding to geographic region.

In an example embodiment, when the quality information request provides an indication that the contribution to the portion of the map data corresponding to the geographic region by the user device 20 and/or the corresponding entity satisfies the one or more significance criteria and/or contribution measures, the network device 10 may, at step/operation 508, generate and provide a position log inquiry and receive a confirmation response thereto. For example, the network device may generate a position log inquiry and provides the position log inquiry such that the user device 20 receives the position log inquiry. Responsive to receiving and/or processing the position log inquiry, the user device 20 checks a position log stored thereby (e.g., a log of GNSS-based and/or other positioning estimates stored in memory 24 that indicates where the user device 20 was located during some time period) to determine whether the user device 20 was located within the geographic region during the sliding time window, for example. In an example embodiment, the user device 20 may determine an amount of time and/or frequency with which the user device 20 was located within the geographic region during the sliding time window, responsive to receiving and/or processing the position log inquiry. When the user device 20 determines that the user device 20 was located within the geographic region during the sliding time window (possibly for an amount of time and/or frequency that surpasses a threshold level), the user device 20 generates and provides a positive confirmation response for receipt by the network device 10. When the user device 20 determines that the user device 20 was not located within the geographic region during the sliding time window (or was located in the geographic region for less than a threshold level amount of time and/or frequency during the sliding time window), the user device 20 generates and provides a negative confirmation response for receipt by the network device 10. The network device 10 receives confirmation response and determines whether the confirmation response is positive or negative. When the network device 10 determines that the confirmation response is positive, the process continues to step/operation 510. When the network device 10 determines that the confirmation response is negative, the process may end and/or the network device 10 may generate and/or provide a message for receipt by the user device 20 that indicates that access to the quality information for the geographic region is being withheld and/or denied. In an example embodiment, the position log is stored by another computer (e.g., a Cloud-based service, provider server, and/or the like) and the position log inquiry is provided to the other computer such that the other computer processes the position log inquiry and provides the confirmation response.

At step/operation 510, the network device 10 determines whether the contribution by the user device 20 and/or corresponding entity to the portion of the map data corresponding to the geographic region satisfies the one or more significance criteria and/or contribution measures. For example, the network device 10 comprises means, such as processor 12, memory 14, and/or the like, for determining whether the contribution by the user device 20 and/or corresponding entity to the portion of the map data corresponding to the geographic region satisfies the one or more significance criteria and/or contribution measures.

In an example embodiment, the network device 10 determines whether the contribution by the user device 20 and/or corresponding entity to the portion of the map data corresponding to the geographic region satisfies the one or more significance criteria and/or contribution measures by processing the quality information request. For example, in an embodiment where the user device 20 determines whether the contribution by the user device 20 and/or corresponding entity to the portion of the map data corresponding to the geographic region satisfies the one or more significance criteria and/or contribution measures, the quality information request may comprise and/or may be an indication that the contribution by the user device 20 and/or corresponding entity to the portion of the map data corresponding to the geographic region satisfies the one or more significance criteria and/or contribution measures. Based thereon, the network device 10 may determine that the contribution by the user device 20 and/or corresponding entity to the portion of the map data corresponding to the geographic region satisfies the one or more significance criteria and/or contribution measures.

In an example embodiment, the network device 10 evaluates the contribution by the user device 20 and/or corresponding entity to the portion of the map data corresponding to the geographic region based on the one or more significance criteria and/or contribution measures to determine whether the contribution by the user device 20 and/or corresponding entity to the portion of the map data corresponding to the geographic region satisfies the one or more significance criteria and/or contribution measures. For example, the network device 10 may determine whether the counter associated with the user device 20 and/or the corresponding entity and corresponding to the geographic region has a value at least as large as and/or greater than a threshold number of instances of radio data. For example, the one or more significance criteria and/or contribution measures may comprise and/or define a threshold number of instances of radio data. When the counter corresponding to a particular geographic region has a value that satisfies the threshold number of instances of radio data (e.g., is at least as large as and/or greater than the threshold number of instances of radio data defined by the significance criteria and/or contribution measures), the user device's 20 and/or the corresponding entity's contribution to the portion of the map data corresponding to the particular geographic region is determined to satisfy the significance criteria and/or contribution measures.

In an example embodiment, the network device 10 may access an entity status associated with the user device 20 and/or a corresponding entity and corresponding to the geographic region. When the access entity status satisfies a status threshold (e.g., indicating that the user device 20 and/or the corresponding entity has provided instances of radio data that are trustworthy enough to be used in generating and/or updating the radio map and/or that the user device and/or corresponding entity is likely not a bad faith actor) it is determined that the user device's 20 and/or the corresponding entity's contribution to the portion of the map data corresponding to the particular geographic region satisfies the one or more significance criteria and/or contribution measures, in an example embodiment. In various embodiments, when the counter associated with the user device 20 and/or the corresponding entity and corresponding to the geographic region satisfies the threshold number of instances of radio data and the entity status associated with the user device 20 and/or the corresponding entity and corresponding to the geographic region satisfies the status threshold, it is determined that the user device's 20 and/or the corresponding entity's contribution to the portion of the map data corresponding to the particular geographic region satisfies the one or more significance criteria and/or contribution measures.

In an example embodiment, the quality information request may comprise and/or be an indication that the number of instances of radio data provided by the user device 20 and/or corresponding entity (e.g., during the sliding time window) comprising respective instances of location data indicating locations located and/or disposed within the geographic region satisfies the threshold number of instances of radio data. The network device 10 then determines whether the entity status associated with the user device 20 and/or a corresponding entity and corresponding to the geographic region satisfies the status threshold to determine whether the user device's 20 and/or the corresponding entity's contribution to the portion of the map data corresponding to the particular geographic region satisfies the one or more significance criteria and/or contribution measures. Various other techniques may be used to determine whether the user device's 20 and/or the corresponding entity's contribution to the portion of the map data corresponding to the particular geographic region satisfies the one or more significance criteria and/or contribution measures, as appropriate for the application.

When, at step/operation 510, it is determined that the contribution provided by the user device 20 and/or a corresponding entity to the portion of the map data corresponding to the geographic region does not satisfy the one or more significance criteria and/or contribution measures, the process continues to step/operation 512. At step/operation 512, the network device 10 withholds and/or denies access to the quality information for the geographic region by the user device 20. For example, the network device 10 may comprise means, such as processor 12, memory 14, communications interface 16, and/or the like, for withholding and/or denying access to the quality information for the geographic region by the user device 20. In an example embodiment, the network device 10 my provide (e.g., transmit) a message indicating the access to the quality information for the geographic region is being withheld and/or denied such that the user device 20 receives the message.

At step/operation 514, the network device 10, in an example embodiment, determines an amount of contribution required for the user device 20 and/or the corresponding entity to gain access to quality information for the geographic region. For example, the network device 10 may determine the amount of contribution required for the user device 20 and/or the corresponding entity to gain access to quality information for the geographic region based on a counter associated with the user device 20 and/or the corresponding entity and corresponding to the geographic region, and the one or more significance criteria and/or contribution measures. The indication of the amount of contribution may be provided as an number of instances of radio, a percentage (e.g., 75% of the required contribution has been already been contributed!), and/or the like. In an example embodiment, a time period (e.g., based on a sliding time window associated with the counter) within which user device 20 and/or the corresponding entity must provide the amount of contribution required for the user device 20 and/or the corresponding entity to gain access to quality information for the geographic region is also determined and provided.

When, at step/operation 510, it is determined that the contribution provided by the user device 20 and/or a corresponding entity to the portion of the map data corresponding to the geographic region does satisfy the one or more significance criteria and/or contribution measures, the process continues to step/operation 516. At step/operation 516, the network device 10 provides quality information for the geographic region such that the user device 20 receives the quality information. For example, the network device 10 may comprise means, such as processor 12, memory 14, communications interface 16, and/or the like for providing quality information for the geographic region such that the user device 20 receives the quality information. For example, the network device 10 may generate and provide (e.g., transmit) a message comprising one or more instances of quality information corresponding to locations located and/or disposed in the geographic region. In various embodiments, the network device 10 may enable the user device 20 to access quality information (e.g., instances of quality information) corresponding to the geographic region via a variety of techniques (e.g., enable access to a database and/or portion thereof storing the quality information for the geographic region, provide access to a cryptographic key that may be used to decrypt quality information for the geographic region, and/or the like) responsive to determining that the contribution provided by the user device 20 and/or a corresponding entity to the portion of the map data corresponding to the geographic region satisfies the one or more significance criteria and/or contribution measures.

In an example embodiment, the one or more instances of quality information are configured to indicate at least one of (a) a quality of infrastructure, (b) a quality of learning, or (c) a quality of positioning enabled at the respective location (e.g., within a specified zone about the location) within the geographic region. In various embodiments, the quality of the infrastructure indicates a number of access points 40 having coverage areas and/or broadcast areas that include the respective location, whether the number of access points 40 having coverage areas and/or broadcast areas that include the respective location is sufficient to enable accurate radio-based positioning, and/or the like. In various embodiments, the quality of learning indicates whether enough instances of radio data have been collected for all and/or enough of the access points 40 that have been observed at or near the location to enable reliable and/or accurate modeling. For example, the quality of learning associated with a particular location is an indication of how well the radio map is believed to represent the radio environment observable at the particular location. In various embodiments, the quality of positioning enabled at the respective location provides an indication of how accurate radio-based positioning enabled by the radio map at or near the respective location is. The quality of positioning is a combination of the quality of infrastructure and the quality of learning as accurate radio-based positioning requires both sufficient infrastructure (e.g., a sufficient number of access points 40 that are observable) and sufficient modeling, understanding, and/or knowledge of that infrastructure.

At step/operation 518, the network device 10 (e.g., periodically, responsive to the updating of a counter and/or status entity associated with the user device 20 and/or a corresponding entity and corresponding to the geographic region, and/or the like) whether access expiration criteria has been met and/or satisfied for the user device 20 and/or the corresponding entity for the geographic region. For example, the network device 10 may comprise means, such as processor 12, memory 14, and/or the like for determining whether access expiration criteria has been met for the user device 20 and/or the corresponding entity for the geographic region. For example, the access expiration criteria comprises that a set length of time has passed since the access to the quality information for the geographic region was provided to the user device 20 and/or the corresponding entity, that the counter associated with the user device 20 and/or the corresponding entity and corresponding to the geographic region has fallen no longer satisfies the threshold number of instances of radio data (e.g., the counter value is less than the threshold number of instances of radio data due to some previous instances of radio data "timing out" as the sliding time window slides forward in time), that the entity status associated with the user device 20 and/or the corresponding entity no longer satisfies the status threshold, and/or the like. For example, the network device 10 may access a counter and/or entity status (e.g., from memory 12) associated with the user device 20 and/or the corresponding entity and corresponding to the geographic region and evaluate the counter and/or entity status based on the access expiration criteria to determine whether the access expiration criteria has been met and/or satisfied for the user device 20 and/or the corresponding entity for the geographic region. In an example embodiment, an amount of time that has passed since the access to the quality information for the geographic region was provided to the user device 20 and/or the corresponding entity may be evaluated to determine the access expiration criteria has been met and/or satisfied for the user device 20 and/or the corresponding entity for the geographic region.

When, at step/operation 518, it is determined that the access expiration criteria has not been met and/or satisfied, the network device 10 continues to provide access to the quality information for the geographic region to the user device 20 and/or the corresponding entity. When, at step/operation 518, it is determined that the access expiration criteria has been met and/or satisfied, the process continues to step/operation 520.

At step/operation 520, the network device 10 stops providing access to the quality information for the geographic region to the user device 20 and/or the corresponding entity. For example, the network device 10 may comprise means, such as processor 12, memory 14, communication interface 16, and/or the like for stopping providing access to the quality information for the geographic region to the user device 20 and/or the corresponding entity. For example, the user device 20 may need to submit another quality information request to regain access to the quality information corresponding to the geographic region. In an example embodiment, the network device 10 begins to withhold and/or deny access to the quality information corresponding to the geographic region from the user device 20. In an example embodiment, the network device 10 may provide a notification to the user device 20 that the network device 10 is now withholding and/or denying access to the quality information corresponding to the geographic region from the user device 20.

In various embodiments, the quality information request comprises and/or indicates a plurality of geographic regions. The network device 10 may determine that user device 20 that provided the quality information request, and/or the corresponding entity, has provided respective contributions in multiple geographic regions of the indicated plurality of geographic regions for which the respective contribution to the portion of the map data corresponding to the respective geographic region satisfies the one or more significance criteria and/or contribution measures. In another example, the quality information request does not indicate any geographic regions and the network device 10 may identify multiple geographic regions for which the contribution provided by the user device 20 that provided the quality information request, and/or the corresponding entity, to the respective portions of map data corresponding to the respective geographic regions respectively and/or individually satisfies the one or more significance criteria and/or contribution measures.

However, it may be desired to provide a user device 20 and/or a corresponding entity with access to quality information for only a couple or a few geographic regions at a time. FIG. 6 provides a flowchart illustrating various processes, procedures, operations, and/or the like performed, for example, by a network device 10, to limit the number of geographic regions for which a computing device 20 and/or corresponding entity is provided with access to corresponding quality information.

Starting at step/operation 602, the network device 10 (responsive to receiving and/or processing a quality information request provided by a user device 20) determines that the contribution provided by a user device 20 and/or a corresponding entity to respective portions of the map data corresponding to a group of geographic regions respectively and/or individually satisfies the one or more significance criteria and/or contribution measures. For example, the network device 10 comprises means, such as processor 12, memory 14, and/or the like, for determining that the contribution provided by a user device 20 and/or a corresponding entity to respective portions of the map data corresponding to a group of geographic regions respectively and/or individually satisfies the one or more significance criteria and/or contribution measures. The group of geographic regions comprises a first number of geographic regions. In an example, the group of geographic regions includes five different geographic regions. The network device 10 then evaluates the first number of geographic regions based on a threshold quantity.

At step/operation 604, the network device 10 determines that the first number of geographic regions is greater than the threshold quantity. For example, the network device 10 may comprise means, such as processor 12, memory 14, and/or the like for evaluating the first number of geographic regions based on a threshold quantity and determining that the first number of geographic regions is greater than the threshold quantity. For example, continuing with the above example where the first number of geographic regions is five, the threshold quantity may be two, such that the first number of geographic regions is greater than the threshold quantity. As should be understood, when the first number of geographic regions is not greater than the threshold quantity, the remainder of the method shown in FIG. 6 need not be completed.

At step/operation 606, the network device 10 selects a set of regions from the group of geographic regions such that the set of regions includes a second number of geographic regions for which the contribution by the user device 20 and/or the corresponding entity to the respective portions of the map data corresponding to the geographic regions included in the set of regions respectively and/or individually satisfies the one or more significance criteria and/or contribution measures. The second number is less than or equal to the threshold quantity. For example, the network device 10 may comprise means, such as processor 12, memory 14, and/or the like, for selecting a set of regions from the group of geographic regions, where the set of regions comprises a second number of geographic regions. In various embodiments, the geographic regions selected from the group of geographic regions for inclusion in the set of regions are selected based on the time since the user device 20 was last located in each geographic region, how frequently the user device 20 is located in each geographic region, the ranking of instances of data the user device 20 provides in each geographic region, a corresponding entity status corresponding to each geographic region, which geographic regions the radio map would most benefit from receiving more instances of radio data corresponding thereto, which geographic regions are associated with the highest or lowest quality levels, scores, and/or the like.

At step/operation 608, the network device 10 provides quality information (and/or access thereto) corresponding to the geographic regions of the set of regions such that the user device 20 receives the quality information and/or can access the quality information corresponding to the geographic regions included in the set of regions. For example, the network device 10 may comprise means, such as processor 12, memory 14, communication interface 16, and/or the like for providing quality information (and/or access thereto)

corresponding to the geographic regions of the set of regions such that the user device 20 receives the quality information and/or can access the quality information corresponding to the geographic regions included in the set of regions.

III. Technical Advantages

Radio-based positioning is a useful positioning tool in areas where GNSS-based positioning is not available and/or when it is desired to reduce battery consumption corresponding to positioning functions. However, accurate radio-based positioning within a geographic area requires radio maps that sufficiently accurately represent the radio environment in the geographic area. In various scenarios, such radio maps are generated through crowd-sourcing of radio data. Therefore, it may be desired to provide indications to users of where the radio map sufficiently accurately represents the radio environment and where additional radio data is needed to improve the representation of the radio environment provided by the radio map. However, it is also desired to prevent open access to such quality information in various situations and/or for a variety of reasons. For example, it may be desired to limit the access to such information to bad faith actors who may attempt to sabotage the radio map. In another example, it may be desirable to limit access to quality information to competitors who may use such information for marketing purposes and/or for exploiting areas where coverage may be lower for their gain. Additionally, in some scenarios it may be possible to reverse engineer various processes of the crowd-sourcing system used to generate the radio map based on a sufficient amount of quality information. Thus, to prevent such reverse engineering it may be desired to limit access to the quality information. These statements are especially true for shared radio maps that are stored and/or shared by a plurality of computing devices associated with a plurality of user accounts and/or entities. Therefore, a technical problem exists regarding how to control access the quality information corresponding to a radio map.

Various embodiments provide technical solutions to these technical problems. In various embodiments, contributions by a user device 20 and/or by entities is tracked, monitored, and/or evaluated for a geographic region prior to the user device 20 and/or corresponding entity being provided with access to quality information for the geographic region. For example, a user device 20 and/or corresponding entity must prove itself to be a good faith actor within a geographic region before the user device 20 and/or corresponding entity is provided with access to quality information for the geographic region. Moreover, when a user device 20 and/or corresponding entity has not provided a contribution to the portion of map data corresponding to a geographic region that satisfies one or more significance criteria and/or contribution measures, access to the quality information for the geographic region is withheld or denied. Additionally, a user device 20 and/or corresponding entity is only provided with access to quality information for a small number (e.g., a threshold quantity) of geographic regions at a time and/or is only provided access to quality information until access expiration criteria are satisfied, in various embodiments. In various embodiments, the tracking of user device 20 and/or corresponding entity contributions to the respective portions of map data corresponding to respective geographic regions is performed through the use of counters that require only small amounts of memory and that require minimal computational resources to maintain and/or access.

Thus, various embodiments provide technical improvements that lead to more accurate radio map being generated for geographical areas. These more accurate radio maps enable the technical improvement of more accurate radio-based positioning. Thus, various embodiments provide technical solutions to technical problems present in the field of radio map generation, updating, and/or maintenance and provide technical improvements to that result in more accurate radio maps and more accurate radio-based positioning.

IV. Example Apparatus

The network device 10 and/or user device 20 of an example embodiment may be embodied by or associated with a variety of computing entities including, for example, a navigation system including a global navigation satellite system (GNSS), a cellular telephone, a mobile or smart phone, a personal digital assistant (PDA), a watch, a camera, a computer, an Internet of things (IoT) item, and/or other device that can observe the radio environment (e.g., receive radio frequency signals from network access points) in the vicinity of the computing entity and/or that can store at least a portion of a radio map. Additionally or alternatively, the network device 10 and/or mobile device 20 may be embodied in other types of computing devices, such as a server, a personal computer, a computer workstation, a laptop computer, a plurality of networked computing devices or the like, that are configured to generate, store, maintain, and/or update a radio map and corresponding quality information; control access to the quality information; generate and/or provide instances of radio data, generate and/or display graphical representations of instances of quality information, and/or the like. In an example embodiment, a user device 20 is a smartphone, tablet, laptop, PDA, and/or other mobile computing device and a network device 10 is a server that may be part of a Cloud-based computing asset and/or processing system.

In some embodiments, the processor 12, 22 (and/or co-processors or any other processing circuitry assisting or otherwise associated with the processor) may be in communication with the memory device 14, 24 via a bus for passing information among components of the apparatus. The memory device may be non-transitory and may include, for example, one or more volatile and/or non-volatile memories. In other words, for example, the memory device may be an electronic storage device (e.g., a non-transitory computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the network device 10 and/or user device 20 may be embodied by a computing entity and/or device. However, in some embodiments, the network device 10 and/or user device 20 may be embodied as a chip or chip set. In other words, the network device 10 and/or device 20 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12, 22 may be embodied in a number of different ways. For example, the processor 12, 22 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 12, 22 may include one or more processing cores configured to perform independently. A multi-core processor may enable multiprocessing within a single physical package. Additionally or alternatively, the processor 12, 22 may include one or more processors configured in tandem via the bus to enable independent execution of instructions, pipelining and/or multithreading.

In an example embodiment, the processor 12, 22 may be configured to execute instructions stored in the memory device 14, 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the network device 10 and/or user device 20 may include a user interface 18, 28 that may, in turn, be in communication with the processor 12, 22 to provide a graphical user interface (GUI) and/or output to the user, such as one or more selectable user interface elements that comprise at least a portion of a description of a respective known landmark, at least a portion of a radio map, a result of a positioning and/or navigation-related function, navigable routes to a destination location and/or from an origin location, and/or the like, and, in some embodiments, to receive an indication of a user input. As such, the user interface 18, 28 may include one or more output devices such as a display, speaker, and/or the like and, in some embodiments, may also include one or more input devices such as a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor 12, 22 (e.g., memory device 14, 24 and/or the like).

The network device 10 and/or user device 20 may optionally include a communication interface 16, 26. The communication interface 16, 26 may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In various embodiments, a network device 10 and/or user device 20 may comprise a component (e.g., memory 14, 24, and/or another component) that stores a digital map (e.g., in the form of a geographic database) comprising a first plurality of data records, each of the first plurality of data records representing a corresponding traversable map element (TME). At least some of said first plurality of data records map information/data indicate current traffic conditions along the corresponding TME. For example, the geographic database may include a variety of data (e.g., map information/data) utilized in various navigation functions such as constructing a route or navigation path, determining the time to traverse the route or navigation path, matching a geolocation (e.g., a GNSS determined location, a radio-based position estimate) to a point on a map, a lane of a lane network, and/or link, one or more localization features and a corresponding location of each localization feature, and/or the like. For example, the geographic database may comprise a radio map, such as a radio positioning map, comprising an access point registry and/or instances of access point information corresponding to various access points. For example, a geographic database may include road segment, segment, link, lane segment, or TME data records, point of interest (POI) data records, localization feature data records, access point data records, radio model data records, and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GNSS data associations (such as using known or future map matching or geo-coding techniques), for example. In an example embodiment, the data records may comprise nodes, connection information/data, intersection data records, link data records, POI data records, and/or other data records. In an example embodiment, the network device 10 may be configured to modify, update, and/or the like one or more data records of the geographic database. For example, the network device 10 may modify, update, generate, and/or the like map information/data corresponding to a radio map and/or TMEs, links, lanes, road segments, travel lanes of road segments, nodes, intersection, pedestrian walkways, elevators, staircases, and/or the like and/or the corresponding data records (e.g., to add or update updated map information/data including, for example, current traffic conditions along a corresponding TME; assign and/or associate an access point with a TME, lateral side of a TME, and/or representation of a building; and/or the like), a localization layer (e.g., comprising localization features), a registry of access points to identify mobile access points, and/or the corresponding data records, and/or the like.

In an example embodiment, the TME data records are links, lanes, or segments (e.g., maneuvers of a maneuver graph, representing roads, travel lanes of roads, streets, paths, navigable aerial route segments, and/or the like as can be used in the calculated route or recorded route information for determination of one or more personalized routes). The intersection data records are ending points corresponding to the respective links, lanes, or segments of the TME data records. The TME data records and the intersection data records represent a road network and/or other traversable network, such as used by vehicles, cars, bicycles, and/or other entities. Alternatively, the geographic database can contain path segment and intersection data records or nodes and connection information/data or other data that represent pedestrian paths or areas in addition to or instead of the vehicle road record data, for example. Alternatively and/or additionally, the geographic database can contain navigable aerial route segments or nodes and connection information/data or other data that represent an navigable aerial network, for example.

The TMEs, lane/road/link/path segments, segments, intersections, and/or nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

V. Apparatus, Methods, and Computer Program Products

As described above, FIGS. 3, 5, and 6 illustrate flowcharts of a network device 10 and/or user device 20, methods, and computer program products according to an example embodiment of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14, 24 of an apparatus employing an embodiment of the present invention and executed by the processor 12, 22 of the respective apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
storing, by a network device, a radio map comprising map data configured to enable radio-based positioning within a geographic area, wherein the radio map is associated with a plurality of instances of quality information, and each instance of quality information of the plurality of instances of quality information corresponds to a respective location within the geographic area;
receiving, by the network device, a quality information request corresponding to a geographic region within the geographic area, the quality information request associated with an entity;
based on a determination of whether a contribution by the entity to a portion of the map data that corresponds to the geographic region satisfies one or more significance criteria, providing or withholding quality information corresponding to the geographic region;
determining that the contribution provided by the entity to the portion of the map data corresponding to each of a first number of geographic regions with the geographic area satisfies the one or more significance criteria;
determining that the first number of geographic regions is greater than a threshold quantity of geographic regions; and
determining a set of regions selected from the geographic regions for which the contributions provided by the entity to the portion of the map data satisfies the one or more significance criteria, the set of regions contains a second number of geographic regions, the second number of geographic regions being at most a threshold quantity of geographic regions,
wherein providing the one or more instances of quality information comprises providing instances of quality information only corresponding to respective locations located within geographic regions included in the set of regions.

2. The method of claim 1, wherein:
when it is determined that the contribution provided by the entity to the portion of the map data corresponding to the geographic region satisfies the one or more significance criteria, transmitting one or more instances of quality information corresponding to respective locations located within the geographic region for receipt by the user device; and
when it is determined that the contribution provided by the entity to the map data corresponding to the geographic region does not satisfy the one or more significance criteria, withholding the instances of quality information corresponding to respective locations located within the geographic region from the user device.

3. The method of claim 1, wherein the one or more instances of quality information are configured such that processing of the one or more instances of quality information by the user device causes the user device to provide a graphical representation of the at least one of (a) a quality of infrastructure, (b) a quality of learning, or (c) a quality of positioning enabled at the respective location within the geographic region.

4. The method of claim 1, wherein the one or more instances of quality information collectively constitute quality information for the geographic region.

5. The method of claim 1, wherein the entity is associated with one of (a) a single device, (b) a user account associated with one or more devices, or (c) a project associated with one or more user accounts.

6. The method of claim 1, wherein the contribution provided by the entity to the portion of the map data corresponding to the geographic region is measured by a number of instances of radio data comprising position estimates corresponding to positions located within the geographic region provided by the entity for use in generating the radio map.

7. The method of claim 6, wherein the one or more significance criteria comprises a threshold number of instances of radio data comprising position estimates corresponding to positions located within the geographic region.

8. The method of claim 6 wherein the number of instances of radio data is adjusted to only account for instances of radio data provided by the entity that are determined to have a low probability of having been manipulated.

9. The method of claim 1, wherein determining whether the contribution provided by the entity to the map data corresponding to the geographic region satisfies the one or more significance criteria comprises determining whether a status associated with the entity satisfies a status threshold, wherein when the status associated with the entity satisfies the status threshold, at least one of the one or more significance criteria is satisfied and when the status associated with the entity does not satisfy the status threshold, the one or more significance criteria are not satisfied.

10. The method of claim 9, wherein the contribution provided by the entity to the map data corresponding to the geographic region comprises one or more instances of radio data comprising position estimates corresponding to positions located within the geographic region provided by the entity for use by the network device in generating the radio map, each instance of radio data of the one or more instances of radio data associated with a ranking indicating a respective trustworthiness of the instance of radio data and the status associated with the entity is determined based at least in part on the ranking associated with at least one of the one or more instances of radio data provided by the entity.

11. The method of claim 1, wherein when it is determined that the contribution provided by the entity to the map data corresponding to the geographic region satisfies the one or more significance criteria, the user device is enabled to access the one or more instances of quality information corresponding to respective locations located within the geographic region until one or more access expiration criteria are met.

12. The method of claim 1, wherein each time the user device submits a map data contribution corresponding to a particular geographic region, a counter corresponding to the particular geographic region is incremented to indicate a volume of the contribution provided by the entity associated with the device to the map data corresponding to the geographic region.

13. The method of claim 12, wherein the volume corresponds to a sliding time window.

14. The method of claim 12, wherein the user device stores the counter and provides a value of the counter as part of the quality information request.

15. The method of claim 14, further comprising providing a position log inquiry requesting the user device confirm that the user device was located at a respective position associated with one or more instances of radio information during a respective time period corresponding to the capture of the one or more instances of radio information and receiving a confirmation generated by the user device in response to the position log inquiry.

16. An apparatus comprising at least one processor and at least one memory storing computer program instructions, the at least one memory and the computer program instructions are configured to, with the at least one processor, cause the apparatus to at least: store a radio map comprising map data configured to enable radio-based positioning within a geographic area, wherein the radio map is associated with a plurality of instances of quality information, and each instance of quality information of the plurality of instances of quality information corresponds to a respective location within the geographic area; receive a quality information request corresponding to a geographic region within the geographic area, the quality information request associated with an entity;

based on a determination of whether a contribution by the entity to a portion of the map data that corresponds to the geographic region satisfies one or more significance criteria, provides or withholds quality information corresponding to the geographic region;

determining that the contribution provided by the entity to the portion of the map data corresponding to each of a first number of geographic regions with the geographic area satisfies the one or more significance criteria;

determining that the first number of geographic regions is greater than a threshold quantity of geographic regions; and determining a set of regions selected from the geographic regions for which the contributions provided by the entity to the portion of the map data satisfies the one or more significance criteria, the set of regions contains a second number of geographic regions, the second number of geographic regions being at most a threshold quantity of geographic regions, wherein providing the one or more instances of quality information comprises providing instances of quality information only corresponding to respective locations located within geographic regions included in the set of regions.

\* \* \* \* \*